(12) United States Patent
Bellessort et al.

(10) Patent No.: US 9,069,734 B2
(45) Date of Patent: Jun. 30, 2015

(54) PROCESSING METHOD AND SYSTEM FOR CONFIGURING AN EXI PROCESSOR

(75) Inventors: Romain Bellessort, Rennes (FR); Youenn Fablet, La Dominelais (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 970 days.

(21) Appl. No.: 12/634,807

(22) Filed: Dec. 10, 2009

(65) Prior Publication Data

US 2010/0153837 A1    Jun. 17, 2010

(30) Foreign Application Priority Data

Dec. 10, 2008    (FR) ..................................... 08 58448

(51) Int. Cl.
  G06F 17/22    (2006.01)
  G06F 17/27    (2006.01)

(52) U.S. Cl.
  CPC ........ G06F 17/2247 (2013.01); G06F 17/2258 (2013.01)

(58) Field of Classification Search
  USPC ........... 715/234, 236, 241, 242; 707/713, 716
  See application file for complete search history.

(56) References Cited

U.S. PATENT DOCUMENTS

| | | | |
|---|---|---|---|
| 7,043,686 B1 * | 5/2006 | Maruyama et al. ........... | 715/242 |
| 7,411,418 B2 * | 8/2008 | Gould et al. .................... | 326/46 |
| 7,433,888 B2 * | 10/2008 | Hunter et al. ........................ | 1/1 |
| 7,441,212 B1 * | 10/2008 | van Antwerpen et al. ..... | 716/132 |
| 7,536,711 B2 * | 5/2009 | Miyashita et al. ................. | 726/3 |
| 7,630,997 B2 * | 12/2009 | Zhang et al. ........................... | 1/1 |
| 7,707,491 B2 * | 4/2010 | Suzumura et al. ............ | 715/234 |
| 8,032,479 B2 * | 10/2011 | Kori ................................ | 706/62 |
| 2006/0117307 A1 * | 6/2006 | Averbuch et al. ............. | 717/143 |
| 2006/0184547 A1 * | 8/2006 | Kamiya ........................ | 707/100 |
| 2008/0120608 A1 | 5/2008 | Shetty et al. .................. | 717/144 |
| 2008/0250055 A1 | 10/2008 | Ruellan et al. ................ | 707/102 |
| 2009/0138529 A1 | 5/2009 | Bellessort ..................... | 707/203 |
| 2009/0183067 A1 | 7/2009 | Fablet .......................... | 715/234 |
| 2009/0287625 A1 | 11/2009 | Fablet et al. ..................... | 706/45 |
| 2010/0001886 A1 | 1/2010 | Bellessort et al. .............. | 341/51 |
| 2010/0010995 A1 | 1/2010 | Fablet et al. ....................... | 707/6 |

OTHER PUBLICATIONS

Lunteren et al, "XML Accelerator Engine",published: 2004, IBM Research, pp. 1-6.*
Chiu et al, A Compiler-Based Approach to Schema-Specific XML Parsing, publisher: Indiana University, published: 2004, pp. 1-11.*

(Continued)

*Primary Examiner* — Wilson Tsui
(74) *Attorney, Agent, or Firm* — Fitzpatrick, Cella, Harper & Scinto

(57) ABSTRACT

A method and system for coding/decoding structured documents having structural items that include one or more elements, by generating configuration data including a unified model representative of the structure of a type of element on the basis of at least one structured configuration document. The unified model is modified to improve compression efficiency by grouping at least two transitions between a same starting item and a group of following items into a single transition from the same starting item in a first priority level and assigning a second priority level for one or more transitions within the grouping. A coding/decoding table using the modified unified model associates first and second priority coding values.

27 Claims, 10 Drawing Sheets

| Circle model | Possible following items (frequency of the transition) |
|---|---|
| circle | background-color (10%) ; border-color (10%) ; r (80%) |
|     background-color | border-color (100%) |
|     border-color | border-width (100%) |
|     border-width | r (100%) |
|     r | x (100%) |
|     x | y (100%) |
|     y | End of circle element (100%) |

$ID_i$       $MU_{circle}$       $IS_j$

(56) References Cited

OTHER PUBLICATIONS

League, C., et al., "Schema-Based Compression of XML Data with Relax NG," Journal of Computers, vol. 2, No. 10, pp. 9-17, Dec. 2007.

Kangasharju, J., et al., "Xebu: A Binary Format with Schema-based Optimizations for XML Data," Helsinki Institute for Information Technology.

Schneider, J., et al., "Efficient XML Interchange (EXI) Format 1.0," W3C, Jul. 16, 2007.

Murata, M., et al., "Taxonomy of XML Schema Languages Using Formal Language Theory," ACM Transactions on Internet Technology, vol. 5, No. 4, pp. 660-704, Nov. 2005.

* cited by examiner

| Document 10A | Document 10B | Document 10C |
|---|---|---|
| <document><br>    <circle<br>        r="50"<br>        x="0"<br>        y="0"/><br></document> | <document><br>    <circle<br>        border-color="red"<br>        border-width="2px"<br>        r="50"<br>        x="0"<br>        y="0"/><br></document> | <document><br>    <circle<br>        background-color="blue"<br>        border-color="red"<br>        border-width="2px"<br>        r="50"<br>        x="0"<br>        y="0"/><br></document> |

Figure 1

| Circle model $M_A$ | Circle model $M_B$ | Circle model $M_C$ |
|---|---|---|
| circle<br>    r<br>    x<br>    y | circle<br>    border-color<br>    border-width<br>    r<br>    x<br>    y | circle<br>    background-color<br>    border-color<br>    border-width<br>    r<br>    x<br>    y |

Figure 3a

| Circle model | Possible following items (frequency of the transition) |
|---|---|
| circle<br>    background-color<br>    border-color<br>    border-width<br>    r<br>    x<br>    y | background-color (10%) ; border-color (10%) ; r (80%)<br>border-color (100%)<br>border-width (100%)<br>r (100%)<br>x (100%)<br>y (100%)<br>End of circle element (100%) |

$ID_i$     $MU_{circle}$     $IS_j$    Figure 3b

| Code | Event | Following grammar |
|---|---|---|
| 0 | Attribute background-color | Gram1 |
| 1 | Attribute border-color | Gram2 |
| 2 | Attribute r | Gram4 |

*Gram0*

Figure 3c

| Code | Event | Following grammar |
|---|---|---|
| 0 | Attribute r | Gram4 |
| 1.0 | Attribute background-color | Gram1 |
| 1.1 | Attribute border-color | Gram2 |

*optimized Gram0*

Figure 3d

| Code | Event | Following grammar |
|---|---|---|
| 0 | Attribute background-color | Gram1 |
| 1 | Attribute border-color | Gram2 |
| 2 | Attribute border-width | Gram3 |
| 3 | Attribute r | Gram4 |

*Gram0*

| Code | Event | Following grammar |
|---|---|---|
| 0 | Attribute border-color | Gram2 |
| 1 | Attribute border-width | Gram3 |
| 2 | Attribute r | Gram4 |

*Gram1*

| Code | Event | Following grammar |
|---|---|---|
| 0 | Attribute border-width | Gram3 |
| 1 | Attribute r | Gram4 |

*Gram2*

| Code | Event | Following grammar |
|---|---|---|
| 0 | Attribute r | Gram4 |

*Gram3*

| Code | Event | Following grammar |
|---|---|---|
| 0 | Attribute x | Gram5 |

*Gram4*

| Code | Event | Following grammar |
|---|---|---|
| 0 | Attribute y | Gram6 |

*Gram5*

| Code | Event | Following grammar |
|---|---|---|
| 0 | End Element | GramDocumentEnd |

*Gram6*

Figure 2

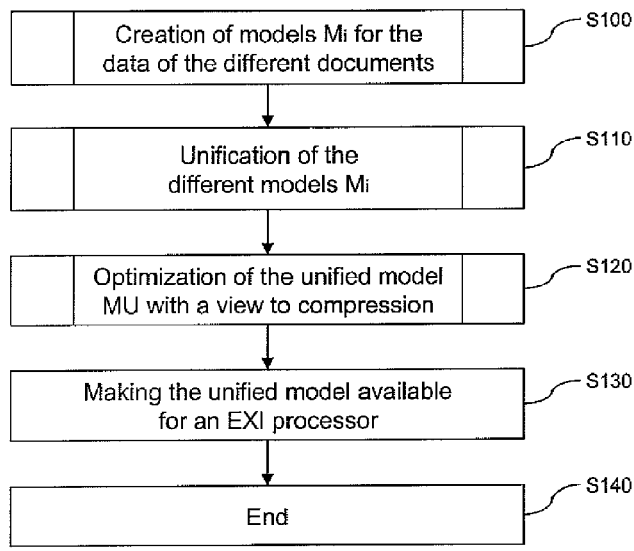
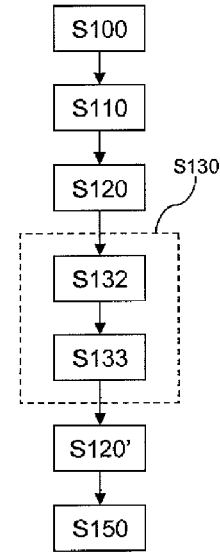
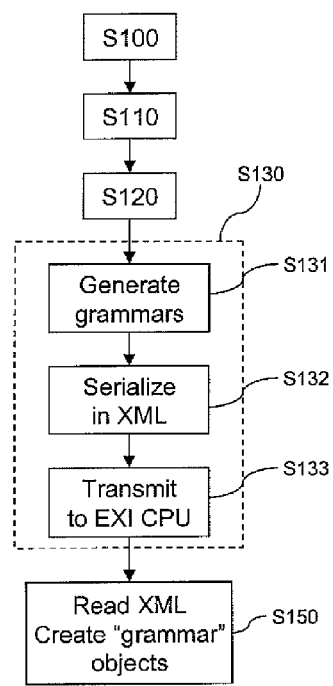
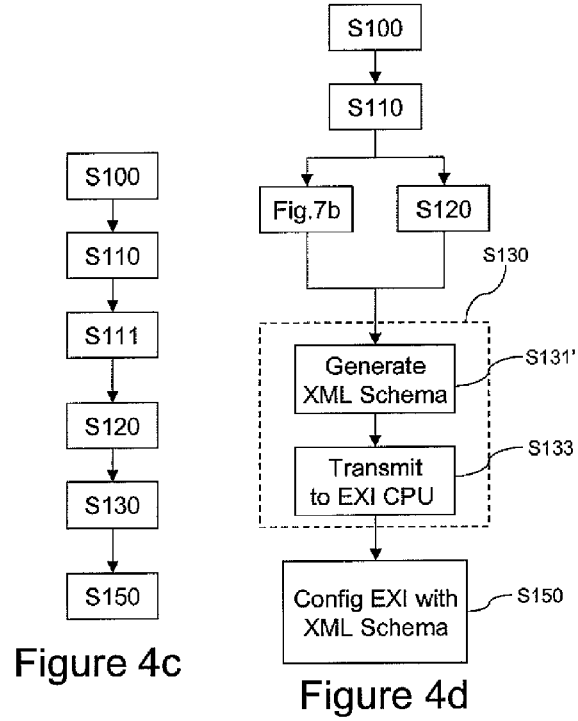
Figure 4
Figure 4b
Figure 4a
Figure 4c
Figure 4d

PROCESSING METHOD AND SYSTEM FOR CONFIGURING AN EXI PROCESSOR

This application claims priority from French patent application Ser. No. 08/58448 filed on Dec. 10, 2008, the entire contents of which are incorporated in the disclosure of the present application.

The present invention concerns a processing method and system for configuring a processor for coding/decoding structured documents. It applies, in particular, to documents of XML type (XML being the acronym for "Extensible Markup Language").

The XML language is a syntax for defining computer languages. Thus XML makes it possible to create languages that are adapted for different uses but which may be processed by the same tools.

An XML document is composed of elements, each element starting with an opening tag comprising the name of the element (for example: <tag>) and ending with a closing tag which also comprises the name of the element (for example </tag>). Each element may contain other elements in hierarchical manner, constituting a hierarchical structure of data, or text data.

Furthermore, an element may be specified by attributes, each attribute being defined by a name and having a value. The attributes are placed in the opening tag of the element they specify (for example <tag attribute="value">).

XML syntax also makes it possible to define comments (for example <!--Comment-->) and processing instructions, which may specify to a computer application the processing operations to apply to the XML document (for example "<?myprocessing?>"), as well as escape sections which make it possible to avoid a section of text being interpreted as a tag when it has the form thereof (for example "<![CDATA[<text>Escape</text>]]>" in which <text> is recognized as a string and not as a tag).

In XML terminology, the set of the terms "element" (identified by an opening tag) "attribute", "text data", "comment", "processing instruction" and "escape section" defining the XML data are grouped together under the generic name of "item".

Several different languages based on XML may contain elements of the same name. To be able to mix several different languages, an addition has been made to XML syntax making it possible to define "Namespaces". Two elements are identical only if they have the same name and are situated in the same namespace. A namespace is defined by a URI (acronym for "Uniform Resource Identifier"), for example "http://canon.crf.fr/xml/mylanguage". The use of a namespace in an XML document is via the definition of a prefix which is a shortcut to the URI of that namespace. This prefix is defined using a specific attribute (for example: the attribute "xmlns:ml="http://canon.crf.fr/xml/mylanguage" associates the prefix "ml" with the URI "http://canon.crf.fr/xml/mylanguage"). Next, the namespace of an element or of an attribute is specified by preceding its name with the prefix associated with the namespace followed by ":" (for example "<ml:tag ml:attribute="value">" indicates that the element tag arises from the namespace ml and that the same applies for the attribute).

The XML format has numerous advantages and has become a standard for storing data in a file or for exchanging data. XML makes it possible in particular to have numerous tools for processing the files generated. Furthermore, an XML document may be manually edited with a simple text editor. Moreover, as an XML document contains its structure integrated with the data, such a document is very readable even without knowing the specification.

However, the main drawback with XML syntax is to be very prolix, sometimes leading to the size of an XML document being several times greater than the intrinsic size of the data. This large size of XML documents thus leads to a long processing time when XML documents are generated and especially when they are read.

To mitigate this drawback, methods for coding an XML document have been sought. The object of these methods is to code the content of the XML document in a more compact form, enabling the XML document to be easily reconstructed. A simple method consists for example of replacing the XML items with symbols. Other more advanced methods exist, in particular the Binary XML formats, among which are known the EXI ("Efficient XML Interchange") or Fast Infoset format, enabling numerous advantages of the XML format to be kept, despite the coding.

EXI is a Binary XML format currently being standardized by the W3C which uses a set of grammars to code an XML document.

To be able to code the items comprised in an XML document, the Efficient XML specification divides each of the elements encountered in the document to code, into elementary parts called events, for example an opening tag or an attribute.

A grammar is composed of a set of productions, each production comprising an XML event description, an associated coding value and the indication of the following grammar to use (for coding the following event). To code an XML event using a grammar, the production containing the most precise description of the XML event is used. The coding value contained in that production is used to represent the event, and the information contained in the event and not described in the production is coded.

A grammar according to Efficient XML may evolve. In a certain number of cases, after the occurrence of an XML event already described by a production of the grammar (if it is not described by a production, it cannot be coded by the grammar), the grammar is modified to include a new production corresponding to that XML event. This production may either contain a more precise description of the event, reducing the number of pieces of information to code to represent the event, or have a more compact coding value.

The coding values, or "codes", are expressed in the form of "priorities" having, generally, between 1 and 3 levels. Coding a coding value amounts to coding the values of its priority. According to the coding mode that is the most advantageous in terms of compression, each level is coded over a minimum number of bits to be able to code the greatest value of that level associated with a production of the grammar. For example, for a level taking values from 0 to 6, the number of coding bits used is 3.

To code an XML document, a set of grammars is used. A few grammars serve for coding the actual structure of the XML document. Furthermore, for each type of XML element present in the document (a type of XML element being a set of elements having the same name), the same set of grammars is used to code the XML elements of that type.

The rules of grammars used may be generic rules, common to all the XML documents and constructed on the basis of the XML syntax. However, they may also be rules specific to a type of document when they are constructed beforehand. This makes it possible to obtain coding (or decoding) that is more efficient in terms of compression.

On decoding, the inverse process is used: the coding value is extracted and makes it possible to identify the coded XML event, as well as the complementary information to decode on the basis of the productions. Furthermore, on decoding, the same grammar evolution rules are used, making it possible at any time to have a set of grammar rules and productions identical to that which was used on coding.

Two types of alignment are provided by the EXI format to represent the coding values: a byte-aligned format, for which the coded data are aligned with the bytes, that is to say that each new string commences with a new byte, for example, and a bit-packed format, for which the data are coded over the smallest possible number of bits. In the latter mode, the strings do not therefore necessarily start with a new byte. The first mode may be decoded more efficiently, whereas the second produces files that are more compressed.

To obtain more efficient coding or decoding operations, it has been seen that it is advantageous to configure, in advance, the software engine for coding or decoding with external configuration data representative a priori of the documents to process.

It has thus been envisaged to appropriate the use of the XML Schema structure description files to that end.

The XML Schema standard or XML schema defines a language enabling the structure of one or more XML documents to be described, through an XML document. The latter describes the set of the elements and the attributes which may be present in an XML document in accordance with that XML Schema document, as well as certain relationships between those elements and those attributes.

The conventional use of this standard, also termed "EXI Schema" when it is applied to the EXI format, concerns the validation of XML documents as being in accordance with the expected structure (that of the XML schema).

Due to its descriptive nature, the XML schema document appears as a good candidate for configuring EXI processors.

More particularly, as an XML schema describes a data model, it is possible to construct grammars representing this model on initializing the coder/decoder. The coding operations by the coder (or decoding) are then reduced to the mere translation of the description in terms of grammars and productions.

The creation of grammars from an XML schema is in particular described in the EXI specification. The latter provides in particular a sub-mode authorizing deviations from the XML schema for configuration, for the cases in which a document does not perfectly conform to the model defined in the XML Schema structure description file. In this case, the coder/decoder provides for inserting additional generic productions in the grammars in order to be able to code the parts which do not strictly conform to the schema. In this way, the knowledge of the schema is taken advantage of, without however requiring documents that conform perfectly.

However, the creation in advance of grammars from an XML schema, or even from a conventionally used configuration file, does not in all cases provide optimum results for the later coding. This is because, as regards the XML schema, the latter is created with the aim of verifying the conformity of documents relative to that schema, and not with the aim of compressing documents.

In particular, XML schemas rely on different elementary models which only partially reflect the possible transitions between the different items they define.

We will illustrate this by the three configuration documents 10A, 10B, 10C of FIG. 1 which we will use to configure a coding processor. Each of these documents describes a circle. For each circle, the radius (attribute "r") and the coordinates of the center (attributes "x" and "y") are specified. For the document 10B the border color (attribute "border-color") and the width of that border (attribute "border-width") are furthermore specified. Lastly, for the document 10C a background color (attribute "background-color") is also specified.

An XML schema resulting from these documents contains the following information:
 the root of the document is a "document" element, which contains a "circle" element;
 the "circle" element possesses the attributes "background-color" (optional), "border-color" (optional), "border-width" (optional), "r" (required), "x" (required) and "y" (required).

Next, if grammars are constructed on the basis of this information in accordance with the EXI Schema specification, without deviation, for the "circle" element, the grammars Gram0, Gram1, . . . are obtained, represented in FIG. 2.

It is found that certain productions, those represented in underlined bold in the tables of FIG. 2, are never used when the documents 10A, 10B and 10C are coded. This is due to the fact that when simply the optional and required attributes are distinguished, it cannot be known which transitions have actually taken place. The grammars constructed thus enable the documents to be coded, but not optimally.

Such deficiencies are also observed in the conventional configuration files.

With this objective, the invention is directed to solving this drawback of the prior art so as to systematically improve the performance resulting from the processing by the processor so configured.

To that end, the present invention concerns in particular a method of processing for the generation of data for configuring a processor for coding/decoding structured documents comprising items, the method comprising a step of generating at least one unified model representative of the structure of a type of element on the basis of at least one structured configuration document, said unified model comprising statistical information on transitions between items made in the occurrences of said element type within said at least one structured configuration document, and the method comprising a step of optimizing said unified model, using the statistical information on transitions, by modification of the unified model, the modification comprising deletion of at least one transition of the unified model and/or grouping together of at least two transitions within the unified model.

The invention takes advantage of the specificities of coding by productions/grammars, in particular the concept of priorities (that is to say the coding values of the productions).

More particularly, by deleting transitions or by grouping them together based on statistics on their occurrences, the invention reduces the number of "transition objects" (that is to say productions) to process for the same priority level. The EXI processor which is then configured using this information from the unified model must then generate a more limited number of priorities at that level, which may lead to a reduction in the number of bits for coding that value in the resulting binary document. This reduction should there are also be studied with regard to the cost increase which the coding of the elements corresponding to the grouped/deleted transitions would give rise to.

To illustrate an advantage of the invention, it may be decided to delete the transitions from the start element <circle> to the item "background-color" and to the item "border-color", in the preceding example, on the basis of their transition frequencies that are too low (10%). The grammar Gram0 would then just contain two productions, and a single bit would be used to code the priority.

As will be seen below, the productions of FIG. 2 in underlined bold may also be avoided and the number of priorities is thus reduced. The resulting coding values are coded over fewer bits. Furthermore, a smaller number of productions is considered by the processor when it is a matter of searching for the production to use for the coding of an item.

In particular, the number that accounts for the non-grouped transitions and the groupings of transitions coming from the same item is reduced to a value less than or equal to a power of 2, itself less than the number of transitions before optimization. In particular, reduction is made to a power of 2 value. The power of 2 immediately below the number of transitions before optimization delimits the number of priorities (and thus of productions) starting from which an additional coding bit is necessary. By limiting the number of transitions/productions (viewed at the priority level considered) to $2^n$, only $2^n$ productions are used and "n" bits are sufficient for the coding of the priorities associated with those productions. A saving is made in coding cost for each coded element if before 'n+1' bits were used before.

The reduction to exactly a power of 2 value ensures that no coding value (in those "n" bits) remains unused.

Several reductions may be successively iterated, each time, to reach a number equal to the power of two below.

According to a particular feature, said optimization step is iterated, in particular on the transitions composing a grouping together. This iteration also makes it possible to save coding bits on the grammar priority levels above.

In one embodiment, the method may comprise a step of generating at least one coding/decoding grammar on the basis of said optimized unified model, said at least one grammar comprising productions associating an item with a coding value and with a following grammar. In particular, the method comprises a step of transmitting the at least one grammar, possibly via a file, to a processor for coding/decoding structured documents. In this configuration, the grammars are generated before transmission to the EXI processor. It should be ensured that the transmitter of such grammars and the EXI processor are compatible from the point of view of the file serving for this transmission: each of them can interpret it. It ensues from this configuration that it only remains for the EXI processor to read those received grammars and generate the corresponding "grammar" objects in its random access memory for the processing (coding/decoding) of the structured documents. The workload of the processor is thus greatly reduced for each new case of coding/decoding.

According to a particular feature, the method comprises, at said processor, a step of optimizing the at least one grammar by deleting at least one production and/or grouping together of at least two transitions corresponding to two productions so as to reduce the number of values of a priority level, in particular by reducing the number to a value less than or equal to a power of 2, itself less than the number before optimization. Here, a second optimization is carried out making it possible to take into account the specificities of the EXI processor: for example taking into account deviation, the keeping of comments, etc.

In a transmission variant, said at least one unified model is transmitted, possibly in the form of a file, to a processor for coding/decoding a structured document, and said optimization is carried out at said coding/decoding processor. Here, a greater number of processing operations is carried out at the processor. However, a global optimization with better performance may be conducted here to take into account the specificities of the processor (deviation, etc.).

In still another variant, said at least one optimized unified model is transmitted, possibly in the form of a file, to a processor for coding/decoding a structured document, and said method comprising, at said processor, a second step of optimizing said optimized unified model by deleting at least one transition and/or grouping together at least two transitions. Here too, this second optimization makes it possible to take into account, with a minimal processing cost at the processor, the specificities specific thereto. It is possible for example to delete one transition or group together two transitions to have a free production (thus code of a priority level that is free). This production will receive a generic production to make provision for deviations or to code comments (in case these are kept). This specificity is thus added to the processor without penalizing the first optimization carried out, that is to say without additional cost for the coding of the productions that are kept.

In an embodiment specific to the XML schema, it is provided that:
on the basis of a unified model for an element type, the items of "attribute" type are listed while specifying their optionality in that type of element and the items of "elements" type are listed in the form of "choice" or "sequence".
said optimizing step comprises deleting at least one item so listed, and
an XML Schema Description file is generated using the items of the optimized list.

It is in particular this XML Schema Description file which is sent to the EXI processor for initial configuration thereof in accordance with the EXI standard. In particular, an element or an attribute of low frequency in the structured configuration documents is deleted from said description file.

For the purpose in particular of performing this low frequency element analysis, provision is made for said transition information to give the transition frequencies for a plurality of transitions corresponding to the same starting item. This unique information on transition frequency enables the coding/decoding processor not only to know the transitions carried out and thus generate the corresponding grammars/productions, but also to adopt a coding policy, for example that is favorable to the most frequent transitions.

In particular, the method comprises a step of generating at least one coding/decoding grammar from said optimized model, and in which said at least one grammar comprises productions associating an item with a coding value and with a following grammar, and coding values are chosen associated with the productions of an item depending on said transition frequencies so as to take coding values over a small number of bits for high transition frequencies. Here "item" is assimilated to "event" except in the case of an element item, for which two events are designated for the start (opening tag) and the end (closing tag) of the element.

In particular, said unified model comprises the list of the items encountered in the occurrences of a type of element, the set of the transitions encountered for each of said items listed and indications representative of the associated transition frequencies. This list includes in particular the initial items for the considered type of element and the frequency of transition from the element start (for the considered type of element) to those initial items. This transition frequency to the initial items substantially corresponds to the frequency of occurrences of each of those initial items in the considered type of element.

By virtue of this unified list, the EXI processor can rapidly configure itself for efficient coding/decoding of documents.

In particular, said optimization comprises the deletion of at least one least probable transition. This deletion is that which, statistically, minimizes the compression loss for the document to code. In particular, addition is made, to a list of the optimized unified model, of the names of the items of which the transitions have been deleted, so as to constitute a dictionary of values for said processor.

As a variant, said optimization comprises the grouping of at least two least probable transitions. In this case, on generating productions to configure the processor, the productions corresponding to the transitions grouped together may have the same value of first priority level for the coding of the corresponding value, and a second priority level is then used to distinguish the different productions within that grouping.

In similar manner, it is possible to group, recursively, productions/transitions within a grouping (by group of power of 2) and to use a third priority level in this way. It is also possible to group together other transitions, so as, ideally, to have $2^n$ groups of transitions (the transitions not grouped together each counting for a group).

This configuration by grouping together optimizes the compression of the data: all the transitions are kept, but the use of each coding bit is maximized by making sure that groups of $2^i$ transitions are kept.

In an embodiment, it is envisaged to combine the grouping together and the deletion of transitions/productions to attain the power of 2 below.

In an embodiment of the invention, the constitution of said unified model comprises a step of creating a simple model representative of each different structure for each type of element encountered in the at least one configuration document, each model comprising a counter of the number of occurrences of that structure in the at least one configuration document. A fine description is thus available of all the combinations of structures for the same type of element, as well as the number of appearances of those structures in each document. This number of appearances enables, among others, later calculation of the transition frequencies.

In particular, the simple models associated with the same type of element are grouped together. This grouping together later enables faster processing for the purpose of generating the above unified model for the considered type of element.

According to another particular feature of the invention, in said simple structure models, the content values encountered for each item encountered in the corresponding occurrences of said element type are inventoried. The content values so retrieved may be supplied to the coding/decoding processor which, thereafter can pre-complete the dictionaries of values. The later coding/decoding processing is thus accelerated.

In an embodiment, the method comprises a step of merging the set of simple models that are associated with the same type of element, so as to generate said unified model for the type of element, the merging step comprising the calculation of the frequencies of a transition on the basis of the number of occurrences of the simple models and the presence of the transition in each of the simple models.

According to a particular feature of the invention, the method comprises a step of constituting groups of configuration documents so as to process, separately, the set of the simple models describing the documents of each group to form unified models specific to each group. This configuration enables separate apprehension of different types of configuration documents and to choose, where possible, the external configuration data resulting from a group of documents that is the most consistent with the document to code. In this way, better coding and compression efficiency is obtained. In particular, the groups of documents (also termed "classes" below) are separate.

Thus, data for configuring the coding/decoding processor are generated with the unified model specific to a group representative of the structured document to code/decode.

In an embodiment of the invention, the type of element defining a unified model takes into account the context in said at least one configuration document, in particular elements of higher hierarchy (in the structure of the document) comprising said element type. This provision makes it possible to differentiate two elements bearing the same name but of which a different use is made in the document. This differentiation thus makes it possible, in particular when those two elements are structurally very different, to maintain efficient coding of the structured document.

In particular, said context takes into account two levels of hierarchy, for example the element of higher level containing the element in course of examination. Keeping only two levels of hierarchy to define the context ensures fast processing and for determining the context of an element.

Also, it can be provided for the context to take into account all the levels of hierarchy up to the structure root in said configuration documents. Thus verification is made of the entirety of the (XML) context in which the two elements to compare are situated before deciding if they are identical.

According to a feature of the invention, the unified models of two element types with the same name but different context are merged. This merging may be conducted when those two unified models are similar or when the difference between those two models is less than a threshold value, for example when they only differ by a single attribute/item. In particular, this difference is determined by the comparison of the two models recursively over the items of elements type contained in those models. Thus the elements of lower hierarchical levels are taken into account.

The invention is also directed to a method of configuring a coding/decoding processor, comprising generating configuration data according to the method set out above and configuring at least one coding table of said processor using the optimized unified model so obtained.

In a complementary manner, the invention relates to a processing system for generating data for configuring a processor for coding/decoding structured documents comprising items, the system comprising:
 means for generating at least one unified model representative of the structure of an element type on the basis of at least one structured configuration document, said unified model comprising statistical information on transitions between items made in the occurrences of said element type within said at least one structured configuration document,
 means for optimizing said unified model, using the statistical information on transitions, by modification of the unified model, the modification comprising deletion of at least one transition of the unified model and/or grouping together of at least two transitions within the unified model.

Optionally, the system may comprise means relating to the features of the configuring method set forth above.

An information storage means, possibly totally or partially removable, that is readable by a computer system, comprises instructions for a computer program adapted to implement the method of generating or configuring in accordance with the invention when that program is loaded and executed by the computer system.

A computer program readable by a microprocessor, comprises portions of software code adapted to implement the method of generating or configuring in accordance with the invention, when it is loaded and executed by the microprocessor.

The means for computer program and information storage have characteristics and advantages that are analogous to the methods they implement.

Still other particularities and advantages of the invention will appear in the following description, illustrated by the accompanying drawings, in which:

FIG. 1 represents three configuration documents used to generate data for configuring a coding/decoding processor;

FIG. 2 illustrates the EXI grammars obtained by a coding/decoding processor according to the state of the art;

FIGS. 3a to 3d illustrate several models and grammars obtained by the implementation of the invention for the documents of FIG. 1;

FIG. 4 represents, in flow diagram form, processing steps according to the present invention;

Figure 5:
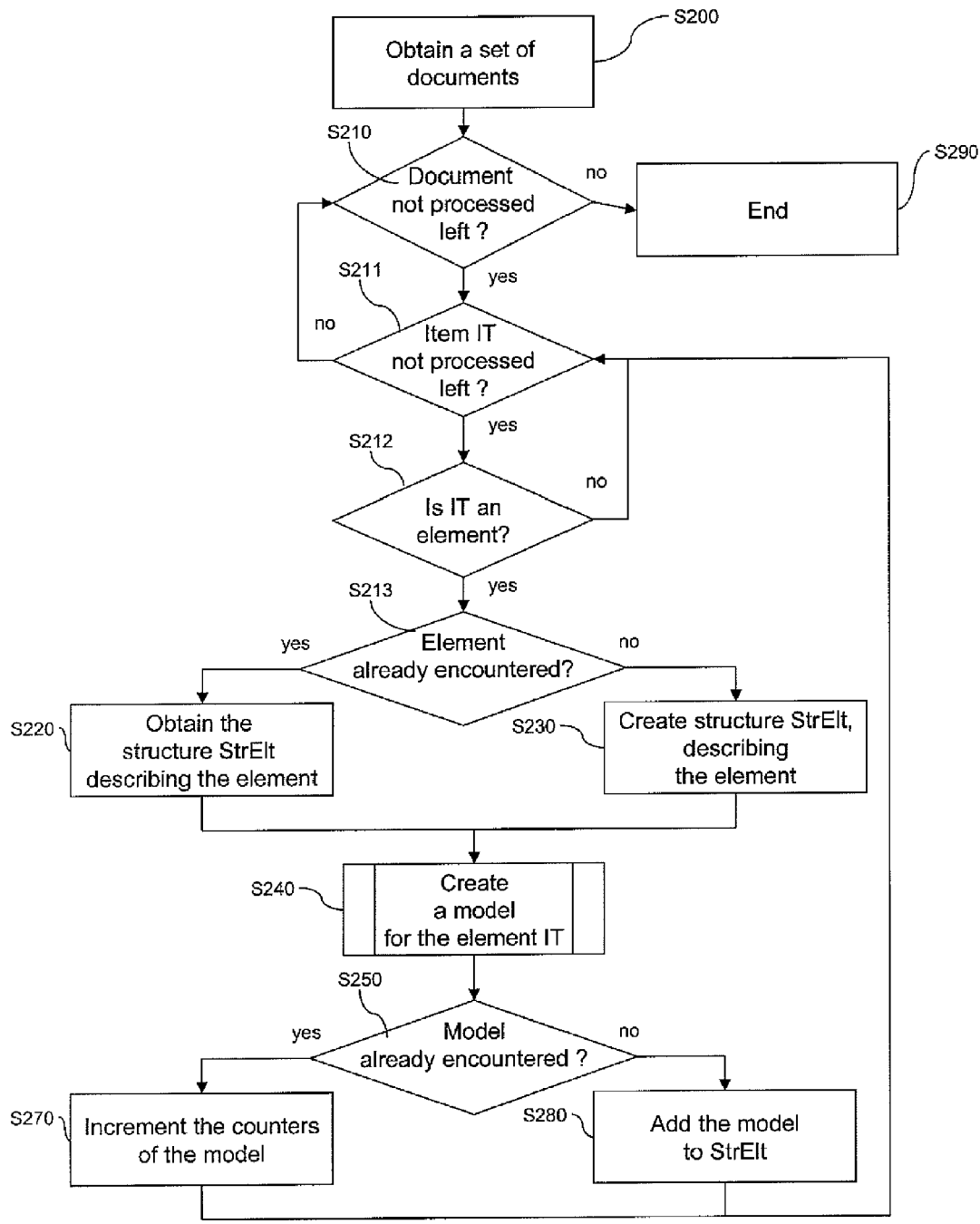
Figure 6:
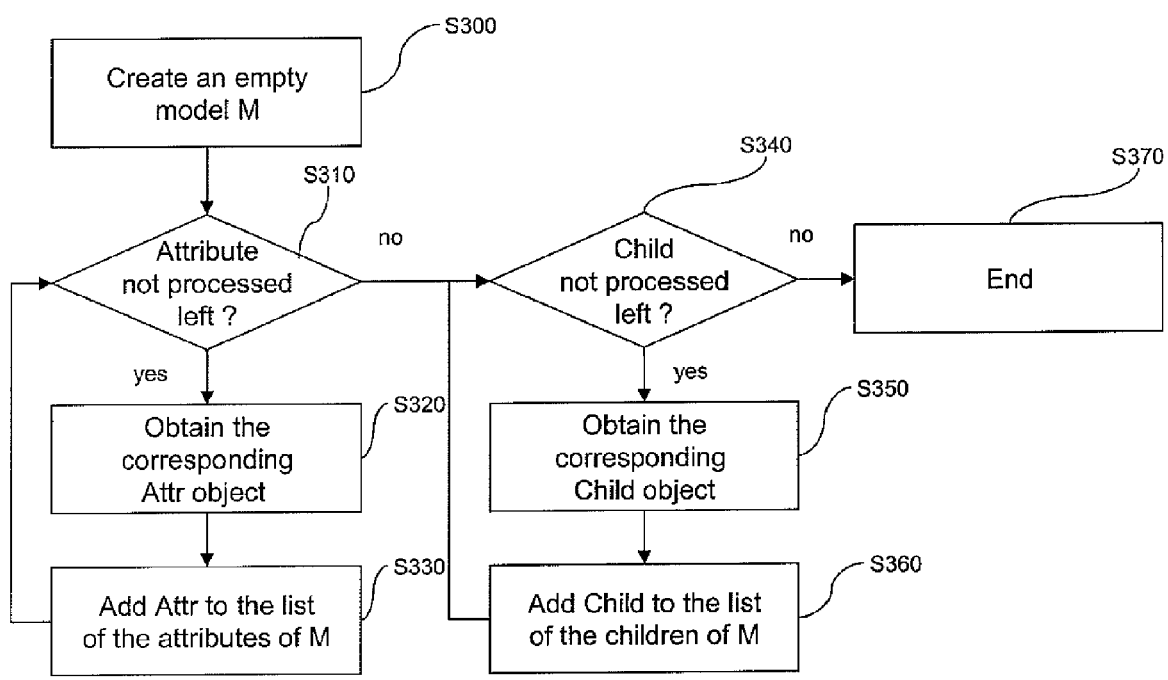
Figure 7A:
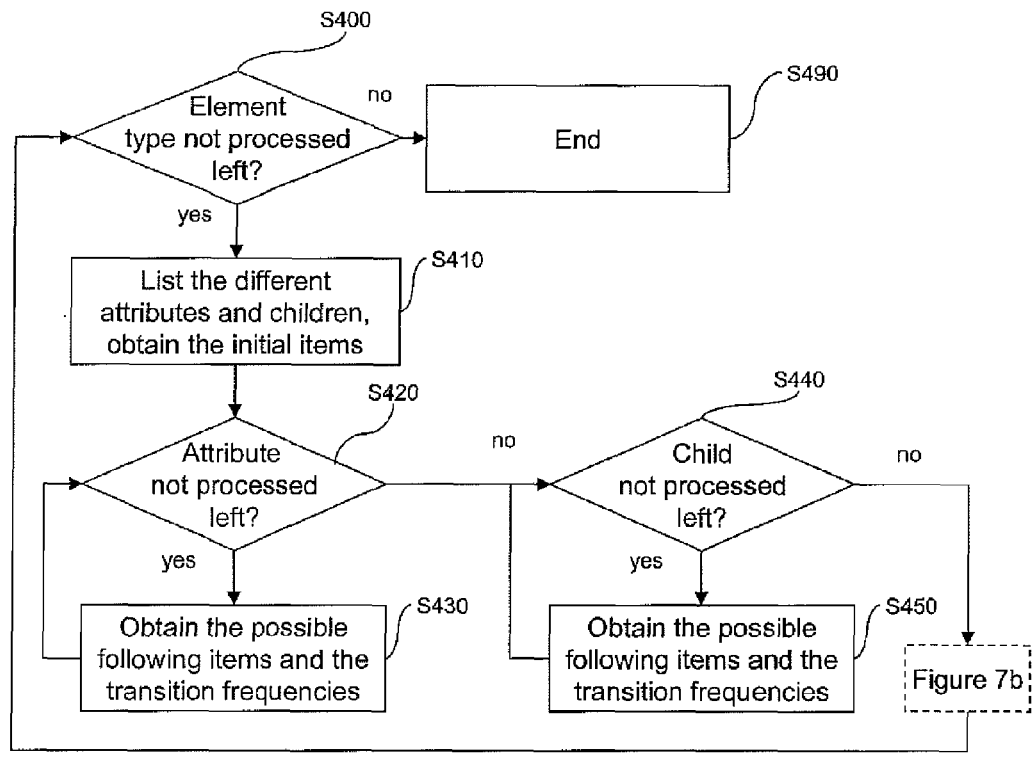
Figure 7B:
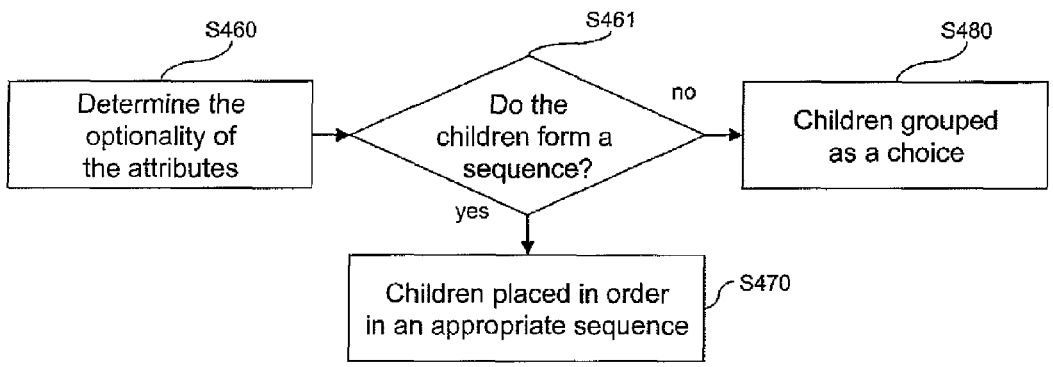
Figure 8:
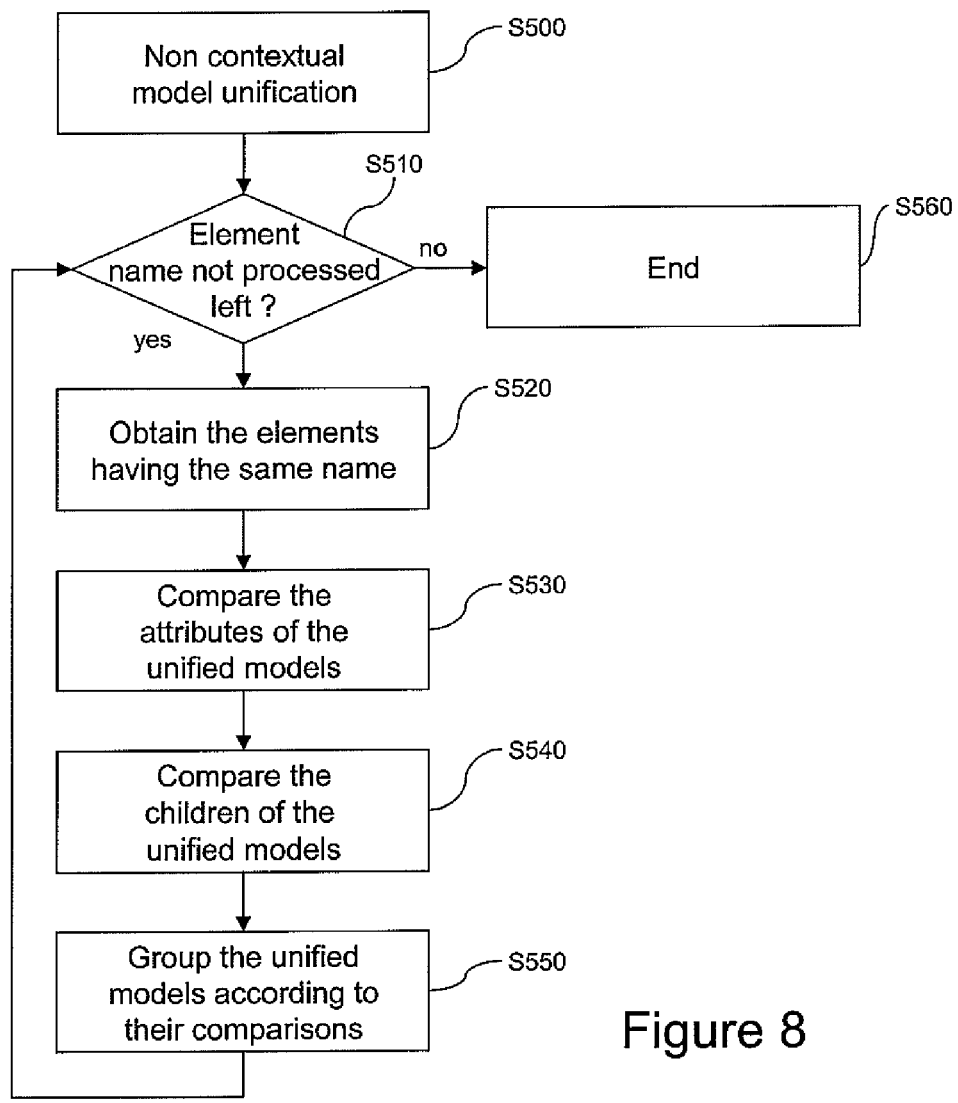
Figure 9A:
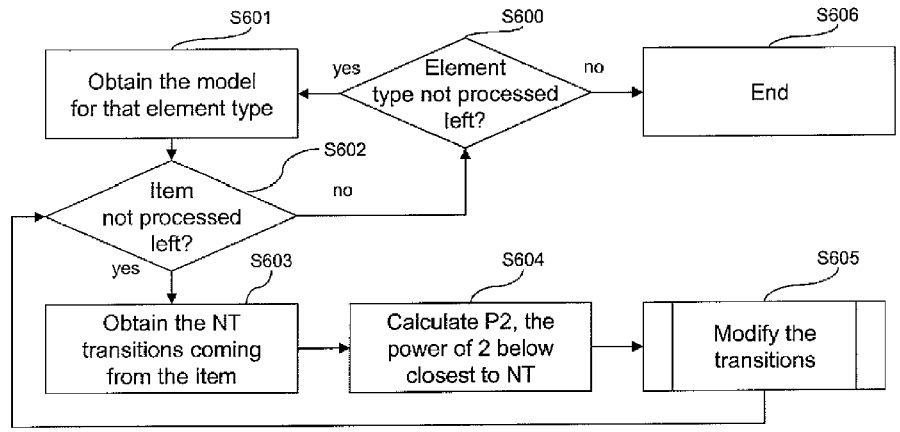
Figure 9B:
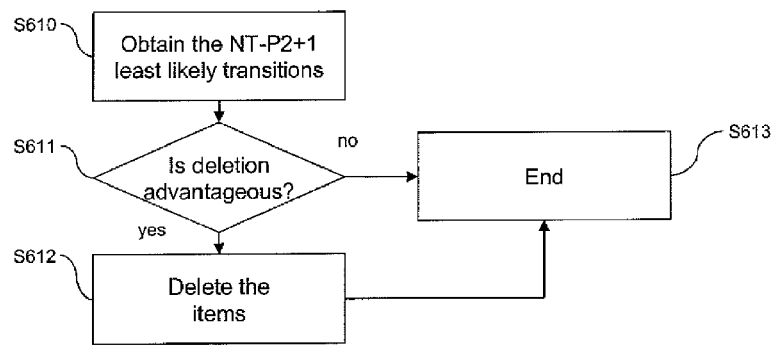
Figure 9C:
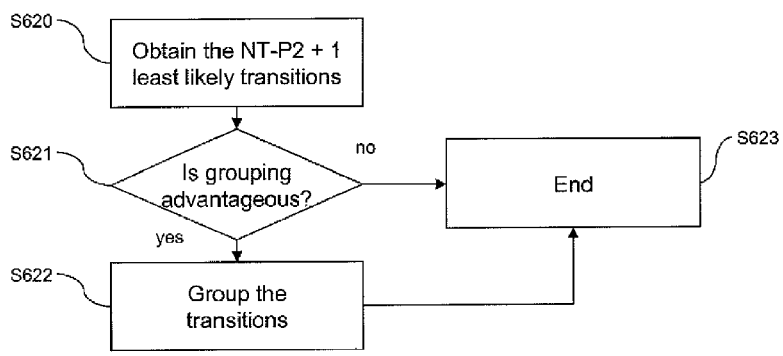
Figure 10:
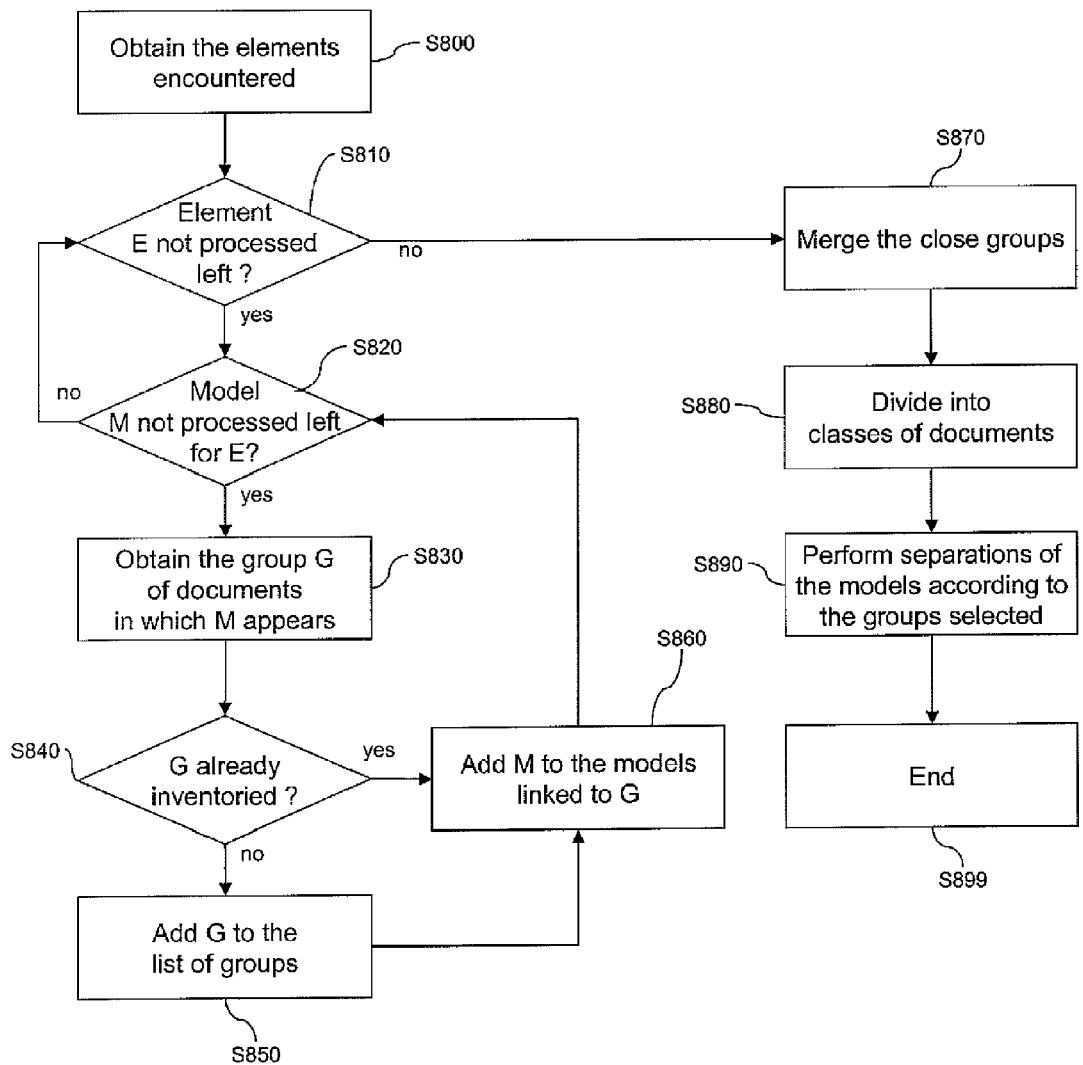
Figure 11:
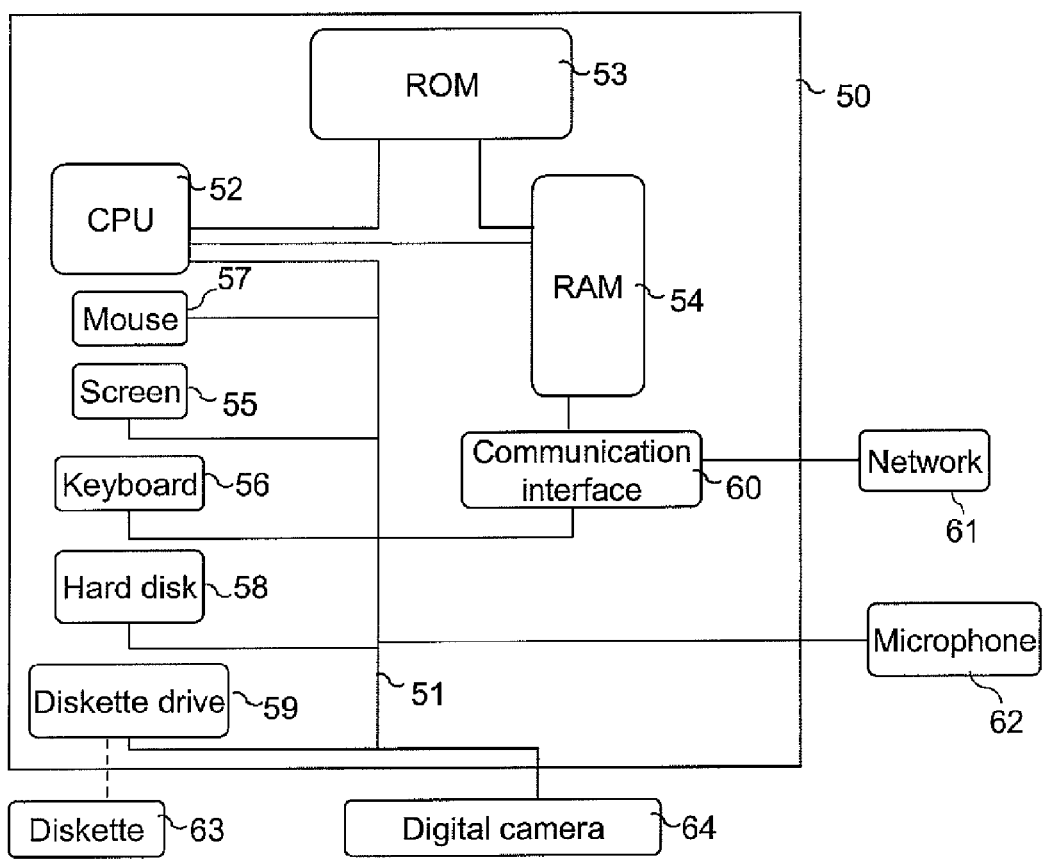

FIGS. 4a to 4d present different embodiments of the linking together of the steps of FIG. 4;

FIG. 5 represents, in flow diagram form, steps for the modeling of data of FIG. 4;

FIG. 6 represents, in flow diagram form, steps for the creation of a model for data of FIG. 5;

FIG. 7a represents, in flow diagram form, steps for unifying models obtained in FIG. 5;

FIG. 7b represents, in flow diagram form, complementary steps of FIG. 7a for generating an XML schema according to the invention:

FIG. 8 represents, in flow diagram form, steps for unifying models obtained in FIG. 5 in the case of contextual elements;

FIGS. 9a to 9c represent, in flow diagram form, steps of optimizing the unified models of FIGS. 7a, 7b and 8, in particular by deletion or grouping together of transitions;

FIG. 10 represents, in flow diagram form, steps for the separation, in the form of groups, of the models obtained in FIG. 5; and FIG. 11 shows a particular hardware configuration of an information processing device adapted for an implementation of the methods according to the invention.

As mentioned above, the EXI specification defines two modes for constructing grammars mainly diverging in the manner in which the grammars are apprehended. On the one hand, the default mode without a schema relies initially on default grammars adapted to describe any type of content, then these are refined on the basis of the data processed. On the other hand, in the mode with an XML schema, grammars describing the documents (with or without deviations) are initially created using the XML schema and modified subsequently.

The mode in which a schema is used is named "EXI Schema" in the EXI specification. However, in the context of this document, it will be named "Non-evolutive EXI", due to the unmodifiable character of the grammars used. Conversely, the mode without a schema is hereinafter designated "Evolutive EXI", in the sense that the grammars used are capable of evolving progressively with the processing of a document.

The EXI Schema mode (Non-evolutive EXI) provides an option for managing deviations, as mentioned previously. In case of activation of this option, an EXI coding/decoding processor may code and decode a document even if it is not in strict conformity with the XML schema used, by virtue in particular of the addition of generic productions making it possible to process any content.

The embodiments provided below in Non-evolutive EXI mode are described mainly without deviation. The person skilled in the art will have no difficulty in extending them to a mode managing deviations, by simple addition of such generic productions.

Nevertheless, in some processing operations, items are deleted from the models used to represent the data to code in accordance with the invention, for example due to their rarity (it may be more advantageous not to take them into account in order not to define any production describing them). In this case, it is appropriate to provide management for deviations since, otherwise, it would be impossible to code the deleted items.

Furthermore, even if the invention is mainly described below with reference to the Non-evolutive EXI mode, it is envisaged to apply it also to a processor in Evolutive EXI mode. In this case, only the embodiment below, based on the production of grammars, is applicable in order to enrich the generic grammars used by the EXI processor before coding/decoding. Thus, from the outset, refined grammars are available, which enables better compression to be obtained of the data without however preventing the grammars from evolving afterwards.

In particular, it may be desirable to use the invention with the Evolutive EXI mode if a sub-set of documents is worked upon having a high number of variations. This is because, in this case, a high number of events is liable not to be present in the grammars obtained by application of the invention, and it is thus worthwhile to maintain the learning capacity of the EXI processor.

Another worthwhile case is that in which limited resources are available. This is because certain operations required by the Non-evolutive EXI mode may be problematic, such as the processing of the XML schema with the aim of creating grammars, or the re-ordering of the attributes (considered in alphabetical order in the Non-evolutive EXI mode according to the EXI specification). In these cases, the use of the Evolutive EXI mode, in which no schema is to be processed and no re-ordering of the attributes is provided, enables an efficient compression to be obtained without implementing such costly operations.

The main steps of the method according to the invention are now described using the example of the configuration documents 10A, 10B, 10C of FIG. 1, with FIG. 3 presenting, in this connection, the evolution of tables and models representative of those documents for the implementation of the invention.

FIG. 4 describes an example of an information extraction method for generating configuration data for the EXI compression according to the invention.

This method commences, at step S100, with the creation of simple models $M_i$ for the data of different documents $10_i$ considered. That step is in particular further detailed below with reference to FIG. 5.

In the context of the example of FIG. 3, a family of documents of type 10A, 10B and/or 10C is possessed (those of FIG. 1). For example, a hundred documents are possessed, 80% of them having the structure of 10A, 10% that of 10B and 10% that of 10C but their content being able to vary (definitions of 100 different circles, i.e. it being possible for the attributes "background-color", "border-color", "border-width", "r", "x" and "y" to vary).

Step S100 aims to model the different structures of content types encountered in each of the documents, here the element defined by the name "circle". By considering the above one hundred documents, the three models $M_A$, $M_B$ and $M_C$ represented in FIG. 3a are obtained at the issue of step S100, for the set of documents.

Each model $M_i$ represents, for a document, a structure of a type of element, and specifies the name of that type of element, here "circle", followed by the ordered list of the items encountered in the occurrences of that structure, here solely attributes.

For each document, as many models $M_i$ are obtained as there are types of different element in that document.

The processing of the invention continues, at step S110, by the unification of the models $M_i$ of the same type of element in all the documents $10_i$ into a single model $MU_{circle}$ for that element type and which is representative of all the models $M_i$ encountered in the documents. When several types of element are present in the documents, a single unified model MU is used which describe the structures of all the different types of contents encountered in the documents.

In this model, for each type of element encountered, here for example "circle", a list is constructed of the items present and of the possible transitions for each item, as well as of statistical information on the transitions, for example the transition frequencies. This step S110 is described in more detail with reference to FIGS. 7 and 8.

In the preceding example, the three models $M_A$, $M_B$, and $M_C$ are unified so as to be able to subsequently deduce therefrom a set of grammars efficiently describing all the models encountered. This model $MU_{circle}$ obtained is represented in FIG. 3b.

It lists, in the left-hand part, the opening tag identifying the "circle" type of element processed and, in order, the different items (here attributes) encountered in the set of the "circle" elements for the documents 10A, 10B and 10C. These elements constitute the starting items $ID_i$ for the transitions between items.

In the right-hand part of the model there are specified the following items $IS_j$ that are possible for each of the items $ID_i$ of the right-hand part and their frequency of occurrence.

Each pair {item $ID_i$; item $IS_j$} for which information is provided defines a transition $TR_{ij}$ made in one of the documents $10_i$, and the corresponding frequencies of occurrence define the frequencies of the transition, denoted $f_{TR}$, for the same starting item.

Due to the distribution of the hundred documents in the three formats 10A, 10B and 10C, there are three initial items that occur: "background-color", "border-color" and "r", with a frequency of occurrence of 80% for the item "r" (since 80% of documents 10A) and 10% of the two others. These frequencies thus correspond to the transition between the opening tag of the (<circle>) element and the first attribute encountered.

In the example, each time there only exists a single following item IS for the other starting items ID and this is the case up to the closing tag of the "circle" end element, hence the frequencies $f_{TR}$=100%.

By virtue of this model $MU_{circle}$, the transitions TR are known which occur in the different documents 10A, 10B, 100 encountered for the "circle" element, and it is thus already possible to produce more efficient grammars than in the case of the XML schema described previously.

In particular, taking into account these transitions, the EXI processor may be configured using those data by processing the grammar Gram0 represented in FIG. 3c. As the first transition TR (from "circle" to "background-color", "border-color" or "r") is the only one to give a choice, consideration may be limited to a single grammar Gram0 offering a choice.

The method according to the invention continues, at step S120, by optimization of the unified model $MU_{circle}$ with a view to the EXI compression. This optimization processing is described in more detail below with reference to FIG. 9.

During this processing, considerations as to the grammars that may be generated by the unified model $MU_{circle}$ are undertaken, so as to determine how that model may be modified to obtain more efficient compression.

In particular, it may be advantageous to allocate different priority levels depending on the frequencies of the transitions.

In the grammar Gram0 of FIG. 3c, there are three codes of level one (0, 1 and 2) used for the three possible transition choices. Consequently, two bits are necessary to code this level. From a coding point of view, there is a loss of efficiency here since four productions could be coded over two bits, and here only three are dealt with.

In this example, the optimization aims to group together two transitions so as to keep only two priority codes of level "1" to save one bit on each code of level "1" that is coded.

The most likely transition is the transition of "circle" to "r" (80%), the two others also being probable (10%). It is thus advantageous to group together the two least probable transitions. The grammar represented in FIG. 3d is then obtained.

In this way, in 80% of cases, only one bit is used instead of two to code the transition to the attribute "r". In the remaining 20% of cases, one bit is used to code the priority level "1" and another bit to code the priority level "2", i.e. two bits in total, that is to say the same number as with the non-optimized grammar. Statistically, it is possible to save 80 bits over a total of 200 bits coded with the non-optimized grammar.

A gain in compression is thus obtained relative to the use of the grammar Gram0 obtained with an XML schema according to the prior art (FIG. 2), in which two bits are necessary to code the four possible productions, which is identical.

For the other transitions, there is never a choice, only one transition being possible. The grammars created are thus all grammars containing a single production, the latter thus requiring no bit to be coded. Compared to the EXI Schema mode, the compression is improved here too since no bit is used to code the transition from "background-color" to "border-color", whereas two bits are necessary with the grammars of the EXI Schema mode (three productions in the grammar Gram1 of FIG. 2, the same applying for the coding of the transition "border-color" to "r" of the grammar Gram 2).

Once the unified model MU has been optimized, it is made available to an EXI processor, at step S130, in the form of configuration data. These data constitute external knowledge, comprehensible by the EXI processor, which enables it to generate initial grammars.

Several cases are envisaged here.

In a first case (FIG. 4a), EXI grammar data are directly generated (S131) that are exploitable by the coding/decoding processor. These are generally "pseudo"-grammars in the sense that they adopt all the information defining an EXI grammar but without having the EXI formalism thereof. Calculation is made in particular of the coding values (or priorities) associated with each of the productions of the grammar.

These grammars are next serialized (S132) in an XML type file which is transmitted (S133) to the processor. The processor can then exploit (S150) this information to configure itself.

This configuration enables better performance to be obtained since the coder/decoder merely creates "grammar" objects by simple reading (S150) of the external configuration data received (these grammars being pre-generated). The generation of the "grammar" objects on the basis of external knowledge is not explicitly described in the EXI specification, with the exception of the case in which an XML schema is possessed (EXI Schema mode), however, the EXI specification also states that the grammars are not linked to XML Schema and that any language for modeling XML data may be used to create grammars. The direct use of the grammars thus remains in accordance with the specification, provided that the processor is able to interpret the file serving for the transfer of the grammars generated (same naming conventions for example).

In a variant (FIG. 4b), the optimized unified model $MU_{optimized}$ is serialized (S132) in an XML file then transmitted (S133) to the EXI processor. In this case, the EXI processor can directly conduct the generation (S150) of the initial grammars for exploitation, but may also conduct a new optimization (S120') of that model to take into account certain local parameters (defining a context specific to the processor) before generation of the grammars. This may be for example the implementation or not of deviations as introduced previously, but also the keeping or not of comments within the XML document to code (in case they are kept, it is appropriate to provide an additional production destined for coding those comments). Here, at each new document to code/decode, the grammars are generated.

In another variant (FIG. 4c), the unified model MU has been transmitted (S111) to the EXI processor which then carries out the optimization step S120, taking into account in particular the local context. A single optimization operation is thus carried out. Grammars are generated locally (S130) from the model thus unified to configure (S150) the EXI processor.

In another case (FIG. 4d), an improved XML schema is generated (S131') on the basis of the optimized model of step S120 and a specific processing operation for the purpose of the creation of such an XML schema (processing explained below with reference to FIG. 7b). This improved XML schema is transmitted (S133) to the EXI processor and next enables the configuration (S150) of the processor by the mechanisms of the EXI Schema mode. This improvement results from the optimization of the unified model, for example by deletion of a low frequency item. This case provides less advantageous compression rates, but integrates directly into the EXI specification (EXI Schema mode). Compared with the use of a conventional XML schema of the prior art (destined uniquely for the validation of XML data), the present invention, when it generates an XML schema for the EXI processor, refines the content of that schema by considering the grammars which will result therefrom, so as to determine the schema which will make it possible to obtain the best compression following the EXI specification.

In a variant, information relative to the transitions can be integrated into the schema, for example by addition of comments. In this way, an EXI processor capable of reading this information could use it to produce grammars enabling greater compression of the data. It should be noted that such a functionality is not provided by the EXI specification, and thus its use would only be possible between two processors having the same understanding of that complementary information inserted into the XML schema.

In summary, either the optimization S120 is carried out outside the EXI processor and thus, at step S130, the optimized unified model $MU_{circle}$ is serialized in a file which is transmitted to the processor, or EXI "pseudo"-grammars are generated which are also transmitted to the processor, or an XML schema is directly serialized, or the optimization S120 is carried out by the processor which, in this case, receives the unified model MU serialized in a transmission file, for example of XML type.

It is to be noted that it is still possible to conduct, at the processor, a new optimization (S120') of the model/of the grammars/of the XML schema received in order to take into account the context specific to the processor. It is possible for example to delete a transition/a production when this deletion makes it possible to save a coding bit for each value to code. The choice of the transition production to delete is for example made depending on the transition frequencies.

In the case in which the grammars are serialized, they are made available to the EXI processor in an XML format to obtain a compact representation. Limiting the size of the data generated has importance since the first aim of the invention is compression: if the data generated are more voluminous than the improvements in compression, the invention loses its value.

However, in the case in which grammars are generated, the invention also has the advantage of making the processing of the data faster, in particular compared with the case in which an XML schema is used.

Lastly, it should be stressed that the cost in memory space of these external configuration data for the processor is fixed (a single description), whereas the savings are variable (saving is made on each file coded).

If the interfaces for constructing the grammars are known by the EXI processor, an alternative solution to the file may consist in generating lines of code from the $MU_{circle}$ model, making it possible to create at the EXI processor the grammars corresponding to the unified model. In this case, it is not necessary to read a file on coding and on decoding, but it suffices for the EXI processor to execute the lines of code to generate the grammars.

The processing for generating the external data for configuring the EXI processor ends at step S140.

It is however to be noted that for the coding of an XML document 20 or for the decoding of a binary document 20', the EXI processor then generates grammars from those external data to configure itself and proceeds with the coding or decoding of those documents in a conventional manner using those grammars (making them evolve or not according to the mode chosen).

In particular, if the serialized file MU or $MU_{optimized}$ is started with, the priority codes must be calculated; if pseudo-grammars in XML format are started with, it suffices to create the corresponding "grammar" objects by mere reading. Lastly, if an XML schema is started with, the schema must be converted into grammars according to the algorithm described in the EXI specification. The costs of configuring the processor are thus variable according to the mode chosen.

A description is now given in more detail of the modeling of the data from a set of documents (step S100) with reference to FIG. 5.

At step S200, a set of configuration documents 10A, 10B, 100 is obtained, for example XML, SVG or Open Office documents.

Given a family of documents of the same type, for example a set of SVG documents (SVG being an acronym for "Scalable Vector Graphics") or Open Office documents, the invention may apply to a subset of that family. The choice of the subset affects the processing time and the efficiency of the model generated: this is because the more documents there are in the subset, the more the processing time increases, and the more the model generated is likely to be representative of all the documents of the family considered.

As the processing according to the invention is generally only carried out once for a given family of documents, it may be advantageous to take into account all the documents of that family, even if the processing time may be significantly lengthened. If it is desired to reduce this processing time, a more restricted subset can be considered, the size of the subset also being linked to the size of the documents: if they are short, the unified model MU remains relatively simple and thus fast to generate; if on the other hand the documents are long, the model MU may become more complex, and thus longer to produce.

For example, it may be envisaged to apply the invention to all the documents of a family of 100 documents of 10 Kbyte. However, for reasons of processing time, it is preferred to restrict a family of 100 documents of 1 Mbyte to 10 or 20 members. It may be noted that for this type of family, it is possible to consider first of all a restricted subset in order to rapidly evaluate the efficacy of the model for the compression, then increase the size of the subset considered if it is desired to obtain better compression.

Lastly, a particular case consists of applying the invention to a subset constituted by a single document, in particular in the case in which the family is itself constituted by a single document, or in the case in which it is known in advance that the documents vary extremely little.

Once a set of documents 10, has been determined and retrieved, step S210 is proceeded to at which it is evaluated whether there remains a document 10, not processed. The processing of a document consists of going through it, using a parser, in order from the start of the document until the end.

In the affirmative, step S211 is proceeded to during which it is evaluated whether there remains an item IT not processed in the current document $10_i$.

If this is the case, at step S212 it is then examined whether the item IT is an element, by detecting for example the presence of an opening tag <element> and a closing tag </element>.

In the negative at step S212, step S211 is returned to.

On the other hand, if there is indeed an element at step S212, it is tested, at step S213, whether that element has already been encountered previously.

By "encountered previously" is meant the fact that an element has already been encountered with the same name in the document $10_i$, and optionally in the same context. A description is given later with reference to FIG. 8 of this concept of context and the processing operations to which taking into account the context gives rise.

If the element IT has not been encountered, at step S230, a structure StrElt linked to that family of elements (same name and optionally same context) is created. This structure StrElt is intended to gather together all the information collected concerning that element, in particular its name, the attributes encountered in that element and their order, as well as the children that it contains. This storage is made in the form of models M as described below, which keep an account of the number of occurrences of the attributes and children. In particular the different sequences of attributes and children encountered are taken into account via these models as described below.

If the element IT considered has been encountered (output YES at step S213), the structure StrElt describing it has already been created, and it thus suffices to obtain it at step S220. These structures StrElt for the elements are in particular stored in memory of the processing processor.

After steps S220 and S230, step S240 is proceeded to of creating a model "M" for the element IT processed. This step is described in more detail with reference to FIG. 6.

At step S300, an empty model "M" is created.

At step S310, it is evaluated whether there remains an attribute not processed for the element IT being studied.

In the affirmative, the object "Attr" is obtained corresponding to that attribute at step S320. In the same way as a structure StrElt is associated with each type of element, to each type of attribute there is associated a structure "Attr" describing it, an attribute type being determined by the name of that attribute and the type of element in which it occurs. Thus, two "name" attributes, one occurring in the "person" element and the other in the "town" element, correspond to two different objects (it being possible for the element type to take into account the context as mentioned previously).

If, at the start of step S320, the required object "Attr" does not exist, it is created.

Once the object "Attr" has been obtained, it is added, at the step S330, to the list of the attributes of the model "M" by using an ordered list of pointers to the different attribute objects "Attr".

Step S310 is then returned to, and when no attribute remains that has not been processed (output NO at step S310), step S340 is proceeded to at which it is examined whether there remains a child of the element IT not processed.

In the affirmative, the object "Child" is obtained corresponding to that child, at step S350. Such an object is defined by the type of child (for example a "child" element or a text value) and by the type of the parent element. In the same way as in the case of the attributes, if the required object does not exist at the start of step S350, it is created.

Once the "Child" object has been obtained, it is added to the list of the children of the model "M" using a pointer in an ordered list, at step S360.

Step S340 is then returned to, and when all the children have been processed (output NO at step S340), the creation of the model ends (step S370).

Returning to FIG. 5, once the model M has been created (output from step S240), at step S250, this created model M is compared to the models already inventoried in the structure StrElt.

If this model M has already been encountered, that is to say if a model having the same attributes and the same children, in the same order, already appears in the list of the models of the structure StrElt, updating is performed at step S270 of the structure StrElt by incrementing the number of occurrences of the model concerned by one.

In the negative (output NO from step S250), the model M is added to the list of the models of StrElt, at step S280.

Since the number of occurrences of each model M is updated and kept, the frequencies of transition can easily be determined from one item to another at the step S110 of unifying the models.

Further to steps S270 and S280, the processing is resumed at step S211, and when no further item remains to be processed (end of the document), step S210 is returned to. There, if all the documents have been processed, the modeling of the data ends, at step S290.

A description is now given in more detail of the unification of the simple models M into a unified model MU (step S110) with reference to FIGS. 7 and 8.

FIG. 7a describes the general case, whereas FIG. 7b provides a necessary restriction in the case in which it is desired to produce an XML schema at the method end. FIG. 8 for its part describes additional processing when the types of element take into account the context of the elements in the above processing operations.

In the general case of FIG. 7a, it is sought to take into account all the transition information stored in the models M in the structures StrElt of the types of element.

Commencement is made at step S400 by checking whether an element type not processed remains.

In the affirmative, listing is carried out at step S410 of the different attributes and children encountered in the simple models M of the structure StrElt for that element type. At the time of this listing, determination is made in particular of the initial items, that is to say the items (attributes or children) capable of occurring immediately after the start of the element considered (after the opening tag of the element). In concrete terms, this is all the items by which the models M commence. At this stage, determination is made, for these initial items, of their respective occurrences which makes it possible to establish the transition frequencies between the opening tag of the element considered and each of the initial items.

Next, at step S420 it is determined whether one of the attributes listed at step S410 remains to be processed.

If this is the case, determination is made, at step S430, again here by virtue of the models M inventoried, of the items $IS_i$ which are able to follow the item processed (by virtue of the sequencing stored in the model M), as well as the transition frequencies for each possible following item. These frequencies are obtained using the number of occurrences of each model, by summing the number of occurrences for that specific transition in each model and by dividing that sum by the number of occurrences of the transitions having the processed attribute as starting item.

Step S420 is next returned to. When all the attributes have been so processed, step S440 is proceeded to at which it is tested whether there remains a child listed at step S410 that has not been processed.

In the affirmative, determination is made, at step S450, of the following children $IS_i$ which are able to follow the processed child, as well as the transition frequencies (calculated in the same way as for the attributes) for each possible following item.

Step S440 is then returned to. And when no further child remains to be processed, step S400 is returned to.

When all the types of element have been processed, the unification of the models ends at step S490.

In the case in which it is desired, for the making available of step S130, to produce an XML schema intended for the EXI compression, it is not possible simply to rely on the transition frequencies, since an XML schema is not in all cases suitable to represent them. More particularly, for example concerning the attributes, the only information really taken into account (except for a private convention specifically developed) concerns their optionality: distinction is uniquely made between the required attributes and the optional attributes.

With reference to FIG. 7b, when it is desired to produce an XML schema, the determination of the optionality of each attribute (step S460) is carried out in the negative of S440, that is to say when all the children have been processed. It suffices for example for this to determine whether the attribute occurs in each model M of the structure StrElt of the element type processed.

Next, concerning the children, the XML schemas distinguish mainly two types of content: choices and sequences.

A choice specifies a set of possible children, and any of these children may occur. By using the attributes minOccurs and maxOccurs provided in the specification for the schemas, it is possible to indicate the minimum number and the maximum number of occurrences for this choice, and thus repeat the choice several times, which thus enables any transition from one child to another.

With regard to a sequence, this specifies a set of possible children in a given order, it being possible for the children to occur only in that order. The notation provided is the following:

```
<sequence minOccurs="x" maxOccurs="y">
    <element name="element 1" minOccurs="a₁" maxOccurs="b₁">
    ...
    <element name="element i" minOccurs="aᵢ" maxOccurs="bᵢ">.
```

By using the optional attributes minOccurs and maxOccurs, it is possible to specify the number of times in which each sequence can occur but also in which each child can occur in a sequence for the element type considered. In the latter case, this corresponds to a transition from the child considered to itself if maxOccurs has a value greater than 1 (it being possible for two occurrences of the child to be consecutive).

At step S461, it is then determined whether the children encountered in the models M form a sequence. For this, it is possible in particular to study the preceding and following children for each child, and if, for the element type considered, a child appears both among the preceding and following children, it cannot then be a case of a sequence. This elementary method does not make it possible to detect any type of sequence within the meaning of XML Schema, but it is not advantageous to seek to model any content as a sequence, since if for this many minOccurs and maxOccurs must be considered, the resulting grammars will be numerous and of little advantage in terms of compression; in such a case, it is simpler to model the children as a choice: this requires fewer calculations, for a similar compression efficiency.

As has just been stated, there may be several possible sequences in some cases: if there are two models, one with children "a" and "b", the other with children "a" and "c", the sequences "a"/"b"/"c" and "a"/"c"/"b" suit both. Only one is kept for the following processing of the invention.

In a variant, it is possible to seek to determine a sequence even though it may mean that an element is repeated several times in this sequence: if it is a case of a model containing the children "a"/"b"/"c", and a model containing the children "a"/"c"/"b"/"d", it is possible to form the sequence "a"/"c"/"b"/"c"/"d".

It is also important to properly determine, for each element of the sequence, the values of the minimum and of the maximum of the number of occurrences of each element, these numbers being taken into account by the EXI specification on creation of the grammars on the basis of a schema (to provide a transition from one element to itself, for example).

If a sequence is determined at step S461, this model is kept to describe the children at step S470 which makes it possible ultimately to produce only the grammars desired (and thus to obtain a better compression of the XML document to code subsequently).

Otherwise, the children are represented using a choice (step S480). Further to steps S470 and S480, the specific processing for generating an XML schema finishes, and the processing continues by a return to step S400.

FIG. 8 illustrates additional steps for the unification of the models M in the case in which the types of element take into account the contexts of the elements, as mentioned above at step S213.

In some cases, it is advantageous to take into account the context and not only the element itself: if in a document two "person" elements are found, but one is a child of the "family" element while the other is a child of the "enterprise" element, it may be that the different information is contained in each of the two elements (for the "person" child of the "enterprise" element, it is possible for example to have a "department" or "function" child element which should not exist for the "person" child of the "family" element). In such a case, a "family_person" element and an "enterprise_person" element are distinguished as of step S213 in order to obtain better compression.

In case the context is taken into account, in the steps further to step S213, such elements correspond to different types of element which are processed separately.

It is to be noted that taking into account the context may be made on two levels of hierarchy (as in the above example), or still more going as far as taking into account the context of the element from the root of the document $10_i$. Of course, the more levels considered, the higher the processing cost incurred, in particular for implementing the steps of FIG. 8 on unification of the models M.

A possible alternative to the examination of the higher hierarchical levels, which is less costly but potentially less precise, consists of using a pre-existing XML schema so as to determine whether, in the schema, elements exist of the same name but with distinct structures. This manner of proceeding is potentially less precise since the schema does not necessarily define several distinct structures (in the previous example, there could be a single "person" element in the schema, its definition encompassing the two cases encountered).

It is also possible to use the schema to determine whether the variability of an element is great (existence or not of optional children or attributes), and to link the taking into account of the context to the variability of the elements.

However, taking into account the context may sometimes result in the creation of a high number of grammars, in which case it is avoided to distinguish the types of elements according to their contexts, but only on the basis of their names.

As represented in FIG. 8, the unification of the contextual models M comprises, at step S500, the unification steps of FIG. 7 applied to all the element types (at minimum those which have the same name since the possible grouping together applies to them).

The following steps are then directed to studying these models to determine whether it is pertinent to keep the contextual aspect in all the unified models. More particularly, to resume the example cited previously, if two unified models, "family_person" and "enterprise_person" are arrived at, but the two models are equivalent in the sense that they describe the same structures, it is preferable to merge the two models into a single "person" model.

Thus, at step S510, it is evaluated whether there remains an element name (common to two different contextual types) that has not already been processed.

In the affirmative, the list of all the contextual types of elements having the same name is obtained at step S520. In the above example, these are the types of which the element is named "person". The unified models MU corresponding to each of these contextual types of element are then retrieved. In the absence of several contextual types of element having the same name, step S510 is returned to in order to consider the following name.

At step S530, comparison is made of the attributes contained in each of these unified models: if two models possess the same attributes, there is no reason to distinguish them from this point of view.

In similar manner, at step S540, the children of these different unified models are compared. It is important at this level to perform a recursive comparison. This is because, even if the children are identical, it may be that the children's children are different, but if the two models considered are merged, there is a risk of losing the context information. Thus, if there are different types of "family_person" and "enterprise_person" element, and each comprises a child named "contact", but that, for the family, this "contact" is composed of a "postal_address" element, whereas, for the enterprise, it is composed of an "electronic_address" element, it is advantageous to maintain the distinction between "family_person" and "enterprise_person".

If no difference of attributes and children is determined between two or several given models MU, those models are merged at step 550. This merger ultimately enables the EXI processor to avoid generating grammars that have no use.

It is however to be noted that more advanced grouping strategies may be used. In particular, it may be that the merging of the two models, even if distinct, does not result in a loss of efficiency in terms of compression. More particularly, adding for example an attribute does not necessarily incur an increase in the number of bits to use for coding the priority level for the productions situated in the same grammar.

Once the unified models have been grouped (or if no grouping together is to be carried out), step S510 is returned to, and when all the element names have been processed, the processing ends at step S560.

With reference to FIG. 9, a description will now be given of the step of optimizing the unified model MU resulting from step S110 for a given type of element.

This Figure illustrates the steps of an operation of processing the unified models MU with a view to the EXI compression, that is to say taking into account the specificities of the EXI standard to determine which model enables the best compression to be obtained. These processing operations are applicable to an EXI processor, whether it be in evolutive EXI mode or non-evolutive EXI mode.

The following description is relative to the case of Non-evolutive EXI without deviation, which is the most able to produce high compression rates. However, the same method is applicable to the other modes, in particular Evolutive EXI, in which case provision is made for the addition, in the grammars created, of generic productions (productions describing an attribute having any name, an element having any name, a text content and an element end).

The optimization of a unified model MU begins, at step S600 of FIG. 9a, by determining whether an element type remains to be processed.

If this is the case, at step S601, the unified model MU for this type of element is obtained, and then, at step S602, it is evaluated whether an item not processed remains in that model MU.

In the affirmative, at step S603, the NT transitions coming from that item are obtained, then, at step S604, the value P2 corresponding to the closest power of 2 strictly less than NT is calculated.

In our example, $MU_{circle}$ of FIG. 3, NT has the value 3 and P2 has the value 2.

These data are then used, at step S605, to modify the transitions for the purpose of reducing the number of transitions thereof to P2. This step is detailed in FIGS. 9b and 9c which respectively describe the deletion of transitions and the grouping together of transitions.

More particularly, in this way it is possible to reduce the number of distinct codes of level "1", and thus to improve the compression. The preferred case consists of having a number of codes of level "1" that are used which is a power of 2, since this means that no available code is lost.

Typically, the modification by deletion concerns the case in which it is desired to generate an XML schema, whereas the modification by grouping concerns the case in which it is desired to generate EXI grammars. Nevertheless, the deletion may also be studied for the case of the grammars.

Further to step S605, step S602 is returned to. When all the items of the model MU have been processed, step S600 is returned to. Here, when all the element types have been processed, the processing ends at step S606.

A description is now given of the modification of the transitions by deletion, with reference to FIG. 9b.

At step S610, the NT-P2+1 least probable transitions (lowest transition frequencies) are obtained. More particularly, by deleting the NT-P2+1 transitions, even if a generic production is added afterwards in order to code the deleted transitions, the number of priorities of level "1" is reduced to a power of 2 and thus 1 coding bit is saved for each item/transition to code.

At step S611, it is evaluated whether this deletion is advantageous from the point of view of the EXI compression.

For this, the number of bits saved (1 bit per use of a transition) is compared to the number of additional bits that the coding of the deleted transitions involves. In concrete terms, if the production is deleted, it is necessary to use a generic production (a production not specifying the name of an item), and thus to code the name of that item. It should be noted that this method only functions in the case in which all the deleted transitions are transitions to the same type of item: this is because, each generic production can only code a single type of transition (for example to an attribute or to an element start), and if there are several types of transitions among the deleted transitions, it is necessary to add as many types of generic productions. Generally, this situation does not make it possible to carry out advantageous deletions, however this case may be processed by replacing the obtainment of the least frequent NT-P2+1 transitions by the obtainment, for example, of the least frequent NT-P2+2 transitions if there are two types of transitions among those NT-P2+2 transitions.

It may be stressed here that in such a case it is desirable to take into account the number of documents in which the item in question appears: this is because, if an attribute, for example, occurs once in N documents, or if it occurs N times in a document, the problem is different since in the first case, it will be necessary to code its name literally for each document (that is to say that the string will be coded which represents its name for each document), whereas in the second case, the name will be coded literally once, then a reference to that name will be coded (after the first occurrence, a symbol shorter than the string will be used, and the cost will thus be reduced).

The additional cost linked to the coding of the deleted transitions may be seen as:

(Cost of coding the name)*(No. of documents having that transition)+(Coding cost of the index of the coded name)*(No. of occurrences of that transition less 1).

The first term corresponds to the literal coding of the name of the item of which the production was deleted for all the documents and the second term corresponds to the coding of each of the occurrences of that item by reference to the name already coded (this reference generally being an index pointing into a coding dictionary).

It is found here that a particularly advantageous embodiment consists of generating a list containing the names of deleted items, these names being taken into account on initializing the EXI processor: in this case, it is never necessary to code the name literally, and the cost increase incurred by the coding of a deleted item is reduced.

Such a list may be integrated into the XML schema generated (by the addition, for example, of elements of which the names match those of the deleted element, with a content of any type (element "any" of the XML Schema specification). Concerning the attributes, in order to avoid problems linked to the namespaces, it is for example possible to define a fictional element containing the deleted attributes, such that the EXI processor adds them to its lists of item names and thus codes them efficiently when it encounters them.

A variant to take into account such a list simply consists of generating an XML file describing it then to use it to parameterize an EXI in advance of any processing.

If the deletion is advantageous, those transitions are deleted from the unified model MU at step S612. The processing then terminates at step S613.

If the deletion is not advantageous, the processing is terminated at step S613.

According to a feature of the invention, this method is iterated to evaluate whether it is desirable to delete more items and thus to save an additional bit concerning the coding of the first priority level. The value P2 is then calculated as the power of 2 immediately below the former P2 value used up till then.

It is to be recalled here that to be able to code these deleted items/transitions, generic productions should be provided for the corresponding grammars.

A description is now given of the modification of the transitions by grouping together, with reference to FIG. 9c.

Commencement is made at step S620 by obtaining the NT-P2+1 least probable transitions. This is because, if these transitions are grouped, the corresponding productions will share the same code of priority level "1", and consequently, there will be P2 different codes of level "1" in the grammar considered. Thus, no code of level 1 is lost and one bit is saved to code each of the productions not grouped. The productions grouped together are then distinguished from each other by different codes of priority level "2".

At step S621, it is examined whether this grouping is advantageous. Without grouping together, a constant number of bits is used for each production, this number being equal to the power of 2 above that is the closest to NT. With this grouping, P2 bits are used per production to code the first priority level (and thus each of the transitions not grouped together), and a number of bits is used to code the second priority level equal to the power of 2 above that is the closest to the number of productions grouped, that is to say to NT-P2+1 (it is to be noted that only the productions grouped together have a second priority level to code).

If more bits are saved that are lost (cost in bits above evaluated on the basis of the occurrences of the transitions), the transitions are grouped at step S622. Further to this step, as in the negative of step S621, the processing ends at step S623.

It is understood here that when the transitions are grouped together, this means that at the time of the subsequent generation of the grammars Gram0, Gram1, . . . , the productions associated with those transitions have the same value at a priority level (that for which is was wished to reduce the number of values taken) and are distinguished by different values at the following priority level.

According to a feature of the invention, this method is iterated to evaluate whether it is desirable to group more transitions in order to save additional bits concerning the coding of the first priority levels. Similarly, the same type of processing may be carried out within the grouped transitions to study the utility of the grouping of the transitions of level "2". In this case, the productions are distinguished by their third priority level.

An advanced embodiment of the invention will now be described with reference to FIG. 10.

At the issue of step S100 of FIG. 4, it is possible to perform an optional step of separating the models M into different groups, according to the configuration documents D, to which they belong. This separation processing may in particular be useful to differentiate types of documents, and thus subsequently to optimize the compression for each of those types.

Commencement is made, at step S700, by the obtainment of the types of elements encountered (which may be contextual).

The objective of the following processing is to determine classes among the documents considered, to subsequently apply the steps S110 and following ones not to all the models created, but to all the models necessary to describe each of the classes identified. The aim is thus to obtain more efficient grammars for the compression of documents of that class or similar.

At step S710, it is determined whether there remains an element type E not processed, and in the affirmative it is verified, at step S720, whether there remains a model M not processed for that type of element E.

If that is the case, at step S730, the group G of documents in which the model M appears is obtained.

At step S740, it is then evaluated whether that group has already been inventoried.

In the negative, the group G is added at step S750 to the list of the inventoried groups.

Further to step S750, or if G has already been inventoried (output YES from step S740), the model M is added at step S760 to the models linked to G.

Step S720 is then returned to, and if there remains no model M not processed, step S710 is returned to.

It may be noted that although, in the aim of clarity, this Figure describes the inventorying of the groups, this operation may be carried out during step S100, on modeling the data.

In the negative of step S710, that is to say if there remains no further element type E not processed, step S770 is proceeded to of merging close groups.

For this, a distance Dist is defined relative to the groups, for example as follows:

Dist(G1, G2)=the number of different models M linked to these two groups G1 and G2, divided by the total number of models M linked to these two groups G1 and G2.

If the distance between two groups is less than a predetermined threshold, for example 25%, these groups are merged into a single group, by union of the groups. This step of merging the groups makes it possible to collect different documents but in which many similar models appear.

Next, at step S780, by considerations as to the groups of documents, classes of documents are identified.

For this, for each document and for each group G of documents, it is determined which proportion the set of the models M linked to the group G represents in the set of the models linked to the document. For example, if a group G is linked to three models, and document $D_i$, belonging to G, instantiates six models, including the three models of G, it may be stated that the models linked to G are representative of $D_i$ to the extent of 50%.

To evaluate this "representivity", account is taken of the models linked to G which are implemented in document D. This is because, due to the merging at step S770, it is possible for some models linked to G not to be implemented in some documents of the group. If only two of the three models of G are implemented by $D_i$, G is then representative of $D_i$ to the extent of 33% (two models out of six).

Thus, for each document $D_i$ the group G which represents it the most is determined. Starting from the document the best represented by a single group $G_{best}$, it is possible to identify a first class, constituted by the documents of that group $G_{best}$ which are sufficiently represented by the models M linked to that group $G_{best}$ (for example at least to the extent of 50%).

The documents belonging to this first class are then removed from the other groups G in which they belong, then the same method is applied to determine a new class.

By iterating in this way, it may be that no class is found for some documents $D_i$. In this case, either a class is created for each of those documents, or a class is created grouping together all those documents.

Once those classes have been defined, at step S790 different groups G of models are separated by retrieving, for each of the classes, all the models M that are able to occur. Subsequently, the processing of the steps S110 and following steps are applied to each of those sets. The processing then terminates at step S799.

In an embodiment by way of variant, classes are not created, but a set of groups is kept. In this case as a matter of fact, it is possible for example to make a group $G_{common}$ emerge corresponding to a base common to all the documents $D_i$, which contains for example all the models instantiated by more than 80% of the documents, and other groups $G_i$ corresponding to the same number of specializations of the common base. One document then corresponds to two groups: the common base $G_{common}$ plus a specialization $G_i$. The advantage of this variant comes from the fact that it enables more efficient processing of the external configuration data by the EXI processor, while avoiding having to process data which have little chance of being actually used (for example by avoiding creating certain grammars).

However, it is not desirable to apply the invention to each of these groups, since provision is not made to use a single group, but a combination of groups. In this case, rather than applying the invention to each of the possible combinations (for example to each common base/specialization combination), a description of the groups is kept, including the information relative to the models M (in particular the transition information).

Then, it is only at the time of processing a document for its coding or decoding that the necessary groups are obtained, then the processing operations according to the invention are carried out in order to determine the grammars or, more generally, the most advantageous coding context for the compression of that document.

This version is also compatible with a variant of the invention in which the processing S120 of the unified models is not applied before making the grammar information available to an EXI processor, but carried out at the EXI processor itself on creation of the grammars. In this case, the grammar information obtained by the EXI processor are not linked to a particular mode (evolutive or non-evolutive), but they describe the unified models as obtained at the issue of step S110. In this way, the EXI processor may use that information in any mode, by taking into account the specificities of each (addition of generic productions for example in the evolutive mode).

In the case of use of $G_{common}$, steps S780 and S790 are not carried out, but it is possible, optionally, to replace step S780 by a step of processing the groups, in order to select only sufficiently frequent groups, the frequency then being linked to the number of documents $D_i$ appearing in a group G as well as to the number of models linked to that group (the more a group contains documents, the less it needs to be linked to a high number of models to be considered as representative, and vice versa.

With reference to FIG. 11, a description is now given by way of example of a particular hardware configuration of a processing device adapted for an implementation of the method according to the invention.

A processing device implementing the present invention is for example a micro-computer 50, a workstation, a personal assistant, or a mobile telephone connected to different peripherals. According to still another embodiment of the invention, the information processing device takes the form of a camera provided with a communication interface to enable connection to a network.

The peripherals connected to the information processing device comprise for example a digital camera 64, or a scanner or any other means of image acquisition or storage, that is connected to an input/output card (not shown) and supplying multimedia data, possibly in the form of XML documents, to the information processing device.

The device 50 comprises a communication bus 51 to which there are connected:

- A central processing unit CPU 52 taking for example the form of a microprocessor;
- A read only memory 53 in which may be contained the programs whose execution enables the implementation of the method according to the invention;
- A random access memory 54, which, after powering up of the device 50, contains the executable code of the programs of the invention as well as registers adapted to record variables and parameters necessary for the implementation of the invention, in particular the models, structures and other grammars of FIG. 3;
- A screen 55 for displaying data and/or serving as a graphical interface with the user, who may thus interact with the programs according to the invention, using a keyboard 56 or any other means such as a pointing device, for example a mouse 57 or an optical stylus;
- A hard disk 58 or a storage memory, such as a memory of compact flash type, able to contain the programs of the invention as well as data used or produced on implementation of the invention;
- An optional diskette drive 59, or another reader for a removable data carrier, adapted to receive a diskette 70 and to read/write thereon data processed or to process in accordance with the invention; and
- A communication interface 60 connected to the telecommunications network 61, the interface 60 being adapted to transmit and receive data.

In the case of audio data, the device 50 is preferably equipped with an input/output card (not shown) which is connected to a microphone 62.

The communication bus 51 permits communication and interoperability between the different elements included in the device 50 or connected to it. The representation of the bus 51 is non-limiting and, in particular, the central processing unit 52 unit may communicate instructions to any element of the device 50 directly or by means of another element of the device 50.

The diskettes 63 can be replaced by any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the processing device to implement the invention may equally well be stored in read only memory 53, on the hard disk 58 or on a removable digital medium such as a diskette 63 as described earlier. According to a variant, the executable code of the programs is received by the intermediary of the telecommunications network 61, via the interface 60, to be stored in one of the storage means of the device 50 (such as the hard disk 58) before being executed.

The central processing unit 52 controls and directs the execution of the instructions or portions of software code of the program or programs of the invention, the instructions or portions of software code being stored in one of the aforementioned storage means. On powering up of the device 50, the program or programs which are stored in a non-volatile memory, for example the hard disk 58 or the read only memory 53, are transferred into the random-access memory 54, which then contains the executable code of the program or programs of the invention, as well as registers for storing the variables and parameters necessary for implementation of the invention.

It will also be noted that the device implementing the invention or incorporating it may be implemented in the form of a programmed apparatus. For example, such a device may then contain the code of the computer program(s) in a fixed form in an application specific integrated circuit (ASIC).

The device described here and, particularly, the central processing unit 52, may implement all or part of the processing operations described in relation with FIGS. 4 to 10, to implement the method of the present invention and constitute the system of the present invention.

The method of the invention does not require the EXI format to be modified, but simply to take into account an initial knowledge, in the same way as an XML schema is taken into account in the EXI Schema mode. Thus the invention makes it possible to obtain a higher compression while remaining in accordance with the EXI specification.

In terms of compression, the present invention applies preferably to the bit-packed format rather than to the byte aligned format. This is because, most often, the invention makes it possible to pass, for example, from 3 bits per production to 2 bits per production. However, when aligned bytes are being worked with, this saving disappears since a new byte is passed on to after having coded each priority level of the production.

Nevertheless, some savings remain effective in byte-aligned mode, in particular when transitions are determined that are certain. In this case (a transition corresponds to a unique production in its grammar), no bit/no byte is necessary to code that production since it is fully determined.

The preceding examples are only embodiments of the invention which is not limited thereto.

In particular, although in the above explanations, the structural aspect of the models M with the transitions between items is mainly described, it is also possible to take into account in the models content values (values taken by the attributes or the text fields of elements for example).

By virtue of these values, attention may be turned to the type of the data (integer, floating, data, Boolean, etc.) in order for example to determine the best adapted XML Schema types to describe them (those which, once the data have been coded, will make it possible to obtain the best compression rate depending on their representation with the codecs defined by EXI).

It is also possible to identify values which repeat for the same content item (for example an attribute for which there is only a small number of possible values, in which case it may be described by means of an enumeration within the meaning of XML Schema), or else values which are repeated through the documents (values present for different items of contents). In this case, it may be desirable to list those values in a dictionary used to initialize the EXI processor, so as to avoid coding them literally.

Lastly, it is still possible to process the data so as to extract therefrom coding parameters that can be used by a codec that can be integrated with EXI. In the case of SVG data for example, it is possible to keep the different values then to study them to determine, for example, a representation format adapted for the numbers encountered, or a dictionary of values able to be used efficiently for the compression of those data.

As a variant, if it is desired to carry out less costly processing and a schema is available for the documents processed, it may be sought to obtain the type of content data from the schema.

Thus, these content values encountered for each item having a content (attribute values, text field values) are integrated in the models M in list form, at step S240.

In particular, the "Attr" and "Child" objects may list the values that the corresponding attributes and children take in the documents $10_i$.

The comparison S250 then does not take account of those listed values, in which case, at step S270, the structure StrElt is updated if necessary with the new content values encountered.

The determination of the types of data (strings, integer number, decimal number, Boolean, etc.), or the identification of the recurrent values, as described above, is in particular conducted at step S430 (attributes) and S450 (children).

All this information relative to the values of contents is then made available to the EXI processor in the same way as the structural information.

The invention claimed is:

1. A method for coding/decoding structured documents comprising structural items which include one or more elements, the method comprising:
   generating at least one unified model representative of the structure of a type of element, wherein the unified model is generated on the basis of at least one structured configuration document, wherein the unified model includes a list of starting items, following items and transitions between respective starting and following items in a first priority level, and wherein the unified model comprises statistical information on transitions made in the occurrences of the element type within the at least one structured configuration document;
   modifying the unified model into a modified unified model so as to improve compression efficiency, using the statistical information on transitions, wherein the modification comprises grouping together at least two of the transitions between a same starting item and a group of following items into a single transition from the same starting item in the first priority level and assigning a second priority level for one or more transitions within the grouping;
   generating configuration data for configuring a coding/decoding processor, wherein the configuration data includes said modified unified model; and
   generating at least one coding/decoding table using the modified unified model by associating a coding value with each transition of the modified unified model, wherein the coding values associated with grouped transitions are composite coding values made of a first priority coding value that is the same for all the grouped transitions combined with a second priority coding value that is different from one of the grouped transitions to another grouped transition.

2. The method according to claim 1, wherein the number that accounts for nongrouped transitions and the groupings of transitions coming from the same starting item is reduced to a value less than or equal to a power of 2, itself less than the number of transitions before modification.

3. The method according to claim 2, wherein the modifying step is iterated.

4. The method according to claim 1, further comprising generating at least one coding/decoding grammar on the basis of the modified unified model, the at least one grammar comprising productions associating an item with a coding value and with a following grammar.

5. The method according to claim 4, further comprising transmitting the at least one grammar to a processor for coding/decoding structured documents.

6. The method according to claim 5, further comprising, at the processor modifying the at least one grammar by deleting at least one production and/or grouping together of at least two transitions corresponding to two productions so as to reduce the number of values of a priority level.

7. The method according to claim 1, wherein the at least one unified model is transmitted to a processor for coding/decoding a structured document, and the modification is carried out at the coding/decoding processor.

8. The method according to claim 7, wherein the modified unified model is further modified by deleting at least one transition and/or grouping together at least two transitions.

9. The method according to claim 1, wherein elements include one or more attributes, and wherein:
   on the basis of a unified model for an element type, attribute items are listed in the list while specifying their optionality in that type of element and the element types are listed in the list in the form of "choice" or "sequence",
   the modifying step comprises deleting at least one item so listed in the list, and
   an XML Schema Description file is generated using the items of the modified unified model.

10. The method according to claim 1, wherein the transition information gives the transition frequencies for a plurality of transitions corresponding to the same starting item.

11. The method according to claim 10, further comprising generating at least one coding/decoding grammar on the basis of the modified unified model,
   wherein the at least one grammar comprises productions associating an item with a coding value and with a following grammar, and coding values are chosen associated with the productions of an item depending on the transition frequencies so as to take coding values over a small number of bits for high transition frequencies.

12. The method according to claim 1, wherein the unified model comprises the list of the items encountered in the occurrences of a type of element, a set of the transitions encountered for each of the items listed, and indications representative of the associated transition frequencies.

13. The method according to claim 1, wherein the modification comprises the deletion of at least one least probable transition.

14. The method according to claim 1, wherein the modification comprises the grouping of at least two least probable transitions.

15. The method according to claim 1, wherein generating the unified model comprises creating a simple model representative of each different structure for each type of element encountered in the at least one configuration document, each simple model comprising a counter of the number of occurrences of that structure in the at least one configuration document.

16. The method according to claim 15, wherein the simple models associated with the same type of element are grouped together into a set of simple models.

17. The method according to claim 15, further comprising merging the set of simple models that are associated with the same type of element to generate the unified model for the type of element, the merging step comprising calculating the frequencies of a transition on the basis of the number of occurrences of the simple models and the presence of the transition in each of the simple models.

18. The method according to claim 15, further comprising constituting groups of configuration documents so as to separately process the set of simple models describing the documents of each group to form unified models specific to each group.

19. The method according to claim 18, wherein data for configuring the coding/decoding processor are generated with the unified model specific to a group representative of the structured document to code/decode.

20. The method according to claim 1, wherein the type of element defining a unified model takes into account the context in the at least one configuration document.

21. The method according to claim 20, wherein the unified models of two element types of the same name but different context are merged.

22. A processing system for coding/decoding structured documents comprising structural items which include one or more elements, the system comprising:
    means for generating at least one unified model representative of the structure of an element type on the basis of at least one structured configuration document, wherein the unified model includes a list of starting items, following items and transitions between respective starting and following items in a first priority level, and wherein the unified model comprises statistical information on transitions made in the occurrences of the element type within the at least one structured configuration document;
    means for modifying the unified model into a modified unified model so as to improve compression efficiency using the statistical information on transitions, wherein the modification comprises grouping together at least two of the transitions originating from the same starting item towards a group of following items into a single transition from the same starting item in the first priority level and assigning a second priority level for one or more transitions within the grouping;
    means for generating configuration data for configuring a coding/decoding processor, wherein the configuration data includes said modified unified model; and
    second generating means for generating at least one coding/decoding table using the modified unified model by associating a coding value with each transition of the modified unified model, wherein the coding values associated with grouped transitions are composite coding values made of a first priority coding value that is the same for all the grouped transitions combined with a second priority coding value that is different from one of the grouped transitions to another grouped transition.

23. A non-transitory computer-readable storage medium storing computer-executable code, which when executed by a microprocessor causes the microprocessor to perform a process comprising:
    generating at least one unified model representative of the structure of a type of element, wherein the unified model is generated on the basis of at least one structured configuration document, wherein the unified model includes a list of starting items, following items and transitions between respective starting and following items in a first priority level, and wherein the unified model comprises statistical information on transitions made in the occurrences of the element type within the at least one structured configuration document;
    modifying the unified model into a modified unified model to improve compression efficiency using the statistical information on transitions, wherein the modification comprises grouping together at least two of the transitions between a same starting item and a group of following items into a single transition from the same starting item in the first priority level and assigning a second priority level for one or more transitions within the grouping;
    generating configuration data for configuring a coding/decoding processor, wherein the configuration data includes said modified unified model; and
    generating at least one coding/decoding table using the modified unified model by associating a coding value with each transition of the modified unified model, wherein the coding values associated with grouped transitions are composite coding values made of a first priority coding value that is the same for all the grouped transitions combined with a second priority coding value that is different from one of the grouped transitions to another grouped transition.

24. The non-transitory computer-readable storage medium according to claim 23, wherein said non-transitory computer-readable storage medium is removable from said microprocessor.

25. The method according to claim 1, wherein the single transition in the first priority level is assigned to an item representing the group of following items and each transition in the second priority level is assigned to the item representing the group of following items.

26. A method for coding/decoding structured documents comprising structural items which include one or more elements, the method comprising:
    generating at least one unified model representative of the structure of a type of element, wherein the unified model is generated on the basis of at least one structured configuration document, wherein the unified model includes a list of starting items, following items and transitions between respective starting and following items, and wherein the unified model comprises statistical information on transitions made in the occurrences of the element type within the at least one structured configuration document;
    modifying the unified model into a modified unified model so as to improve compression efficiency, using the statistical information on transitions, wherein the modification comprises deletion of at least one transition of the unified model and a respective following item in the list so as to lose reference to any transition between the respective starting and following items in the modified unified model;
    generating configuration data for configuring a coding/decoding processor, wherein the configuration data includes said modified unified model; and
    generating at least one coding/decoding table using the modified unified model by associating a coding value with each transition of the modified unified model, wherein the coding/decoding table comprises a generic entry associated with a coding value to encode a deleted transition and its items.

27. A processing system for coding/decoding structured documents comprising structural items which include one or more elements, comprising:
    means for generating at least one unified model representative of the structure of a type of element on the basis of at least one structured configuration document, wherein the unified model includes a list of starting items, following items and transitions between respective starting and following items, and wherein the unified model comprises statistical information on transitions made in the occurrences of the element type within the at least one structured configuration document;

means for modifying the unified model into a modified unified model to improve compression efficiency, using the statistical information on transitions, wherein the modification comprises deletion of at least one transition of the unified model and a respective following item in the list so as to lose reference to any transition between the respective starting and following items in the modified unified model;

means for generating configuration data for configuring a coding/decoding processor, wherein the configuration data includes said modified unified model; and second generating means for generating at least one coding/decoding table using the modified unified model by associating a coding value with each transition of the modified unified model, wherein the coding/decoding table comprises a generic entry associated with a coding value to encode a deleted transition and its items.

* * * * *